US012103682B2

(12) United States Patent
Blake et al.

(10) Patent No.: US 12,103,682 B2
(45) Date of Patent: Oct. 1, 2024

(54) PACKAGE COUPLING APPARATUS WITH STRAP AND HANGER FOR SECURING A PACKAGE TO A UAV AND METHOD OF SECURING A PACKAGE FOR DELIVERY

(71) Applicant: Wing Aviation LLC, Mountain View, CA (US)

(72) Inventors: Jesse Blake, Sunnyvale, CA (US); Evan Twyford, Mountain View, CA (US); Ivan Qiu, Mountain View, CA (US); Jasper Lewin, Mountain View, CA (US)

(73) Assignee: Wing Aviation, LLC, Palo Alto, CA (US)

(*) Notice: Subject to any disclaimer, the term of this patent is extended or adjusted under 35 U.S.C. 154(b) by 236 days.

(21) Appl. No.: 17/555,099

(22) Filed: Dec. 17, 2021

(65) Prior Publication Data
US 2023/0192295 A1    Jun. 22, 2023

(51) Int. Cl.
*B64D 1/12* (2006.01)
*B64C 39/02* (2023.01)
*B64D 1/22* (2006.01)
*B66C 1/18* (2006.01)
*B64U 101/60* (2023.01)

(52) U.S. Cl.
CPC .............. *B64D 1/12* (2013.01); *B64D 1/22* (2013.01); *B66C 1/18* (2013.01); *B64U 2101/60* (2023.01)

(58) Field of Classification Search
CPC .......... B64D 1/22; B64D 1/12; B64C 39/024; B66C 1/28; B66C 1/66

USPC ................................ 294/2, 82.33, 68.3
See application file for complete search history.

(56) References Cited

U.S. PATENT DOCUMENTS

| | | | | |
|---|---|---|---|---|
| 4,309,011 A | * | 1/1982 | Spector | A47G 1/20 248/205.3 |
| 4,487,319 A | * | 12/1984 | Barrash | B65D 5/46032 206/427 |
| 4,919,466 A | * | 4/1990 | Consler | A45F 5/1026 294/170 |
| 5,258,647 A | * | 11/1993 | Wojnarowski | H01L 24/75 257/E23.178 |
| 6,092,401 A | * | 7/2000 | Sankey | E05B 73/0029 70/57.1 |
| 6,311,531 B1 | * | 11/2001 | Sykes | E05B 73/0017 292/307 R |
| 6,872,439 B2 | * | 3/2005 | Fearing | B81B 3/0059 264/222 |
| 8,978,210 B2 | * | 3/2015 | Arjomand | B65D 63/14 24/17 AP |
| 10,035,623 B1 | | 7/2018 | Prager et al. | |
| 10,131,428 B1 | | 11/2018 | Sopper et al. | |
| 10,301,024 B1 | | 5/2019 | Sopper et al. | |

(Continued)

*Primary Examiner* — Paul T Chin
(74) *Attorney, Agent, or Firm* — McDonnell Boehnen Hulbert & Berghoff LLP

(57) ABSTRACT

A package coupling apparatus for securing a package to an unmanned aerial vehicle (UAV) is provided. The package coupling apparatus includes a hanger and a strap coupled to the hanger. The hanger includes a base configured to be positioned adjacent to the package and a handle extending up from the base. The handle includes a handle opening and a bridge that extends over the handle opening. The bridge is configured to be secured by a component of the UAV. The strap is configured to surround the package and secure the package to the hanger.

20 Claims, 27 Drawing Sheets

(56) References Cited

U.S. PATENT DOCUMENTS

| | | | |
|---|---|---|---|
| 10,308,360 B2 | 6/2019 | Sopper et al. | |
| 10,577,105 B2 | 3/2020 | Prager | |
| 10,773,930 B2* | 9/2020 | Shin | B64D 1/22 |
| 10,793,272 B2 | 10/2020 | Shannon et al. | |
| 10,793,274 B2 | 10/2020 | Prager et al. | |
| 11,802,023 B2* | 10/2023 | Hafenrichter | B64D 1/22 |
| 2019/0010031 A1* | 1/2019 | Humble | B66D 1/485 |
| 2019/0152600 A1* | 5/2019 | Kuk | B66C 1/34 |
| 2019/0256210 A1* | 8/2019 | Prager | B64C 39/024 |
| 2020/0207474 A1* | 7/2020 | Foggia | G05D 1/0676 |
| 2023/0192449 A1* | 6/2023 | Blake | B66C 1/101 |
| | | | 220/752 |

\* cited by examiner

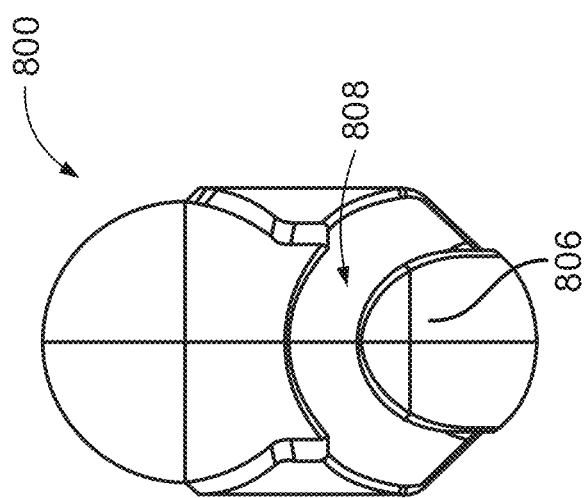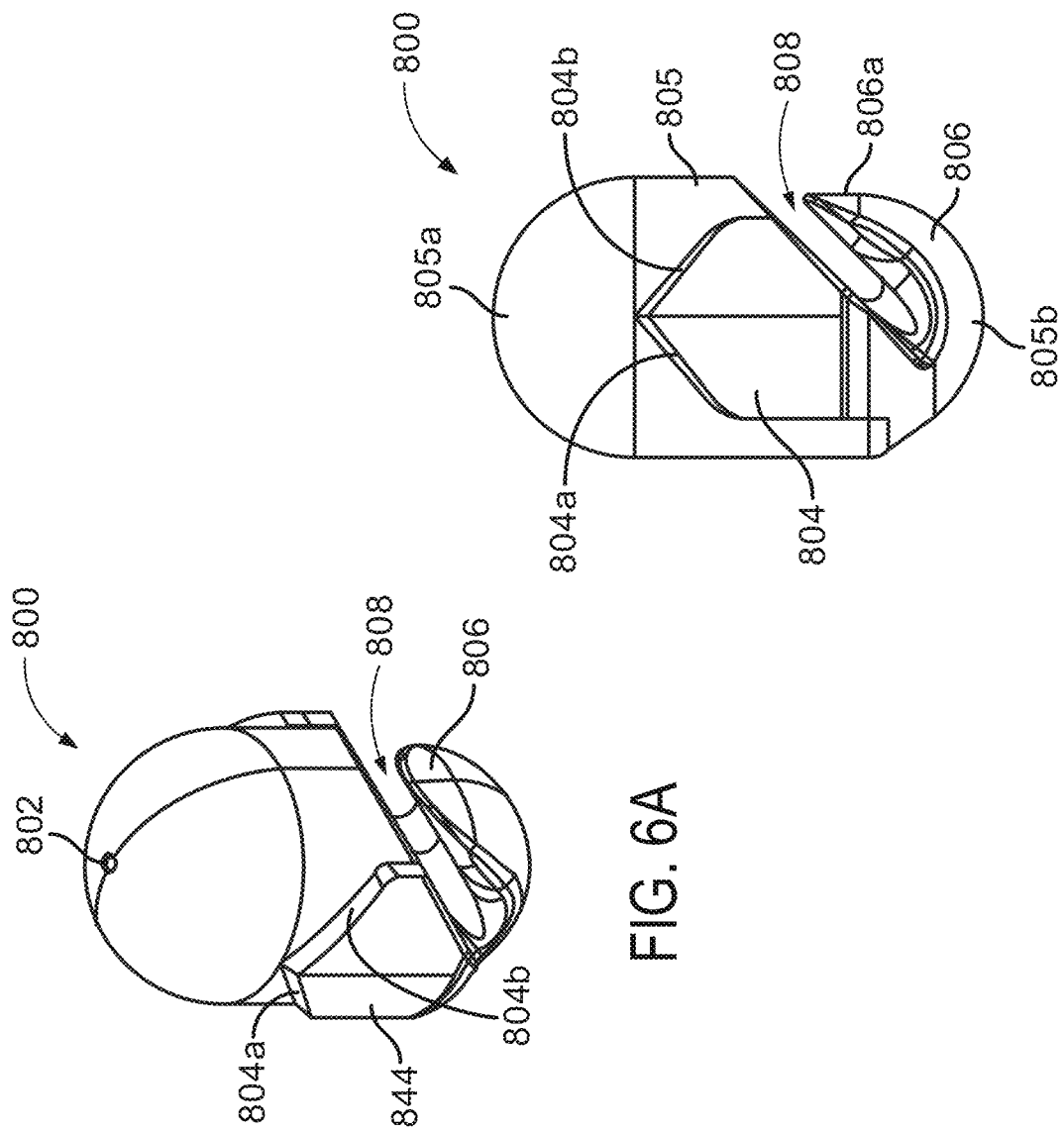

PACKAGE COUPLING APPARATUS WITH STRAP AND HANGER FOR SECURING A PACKAGE TO A UAV AND METHOD OF SECURING A PACKAGE FOR DELIVERY

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments are directed to a package coupling apparatus configured to be attached to a package and includes structures that can be secured by a component of the UAV, such as a payload retriever. With the package secured to the UAV using the package coupling apparatus, the payload can be safely transported or raised and lowered by manipulating a tether attached to the payload retriever.

In one aspect, a package coupling apparatus for securing a package to an unmanned aerial vehicle (UAV) is provided. The package coupling apparatus includes a hanger and a strap coupled to the hanger. The hanger includes a base configured to be positioned adjacent to the package and a handle extending up from the base. The handle includes a handle opening and a bridge that extends over the handle opening. The bridge is configured to be secured by a component of the UAV. The strap is configured to surround the package and secure the package to the hanger.

In another aspect, a system for carrying a payload using an unmanned aerial vehicle (UAV) is provided. The system includes a package for housing the payload that has an upper surface and a lower surface. The system also includes a package coupling apparatus having a hanger and a strap coupled to the hanger. The hanger includes a base configured to be positioned adjacent to the package and a handle extending up from the base. The handle includes a handle opening and a bridge that extends over the handle opening. The bridge is configured to be secured by a component of the UAV. The strap is configured to surround the package and secure the package to the hanger.

In another aspect, a method of securing a package for carrying a payload using an unmanned aerial vehicle (UAV) is provided. The method includes positioning a hanger of a package coupling apparatus on a package such that a base of the hanger is adjacent to an upper surface of the package and a handle of the hanger extends up from the base. The handle includes a handle opening and a bridge that extends over the handle opening. The method also includes arranging a strap that is coupled to the hanger so as to surround the package and secure the hanger to the package.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6A is a perspective view of a payload retriever, according to an example embodiment.

FIG. 6B is a side view of the payload retriever shown in FIG. 6A.

FIG. 6C is a front view of the payload retriever shown in FIGS. 6A and 6B.

DETAILED DESCRIPTION

Figure 1A:
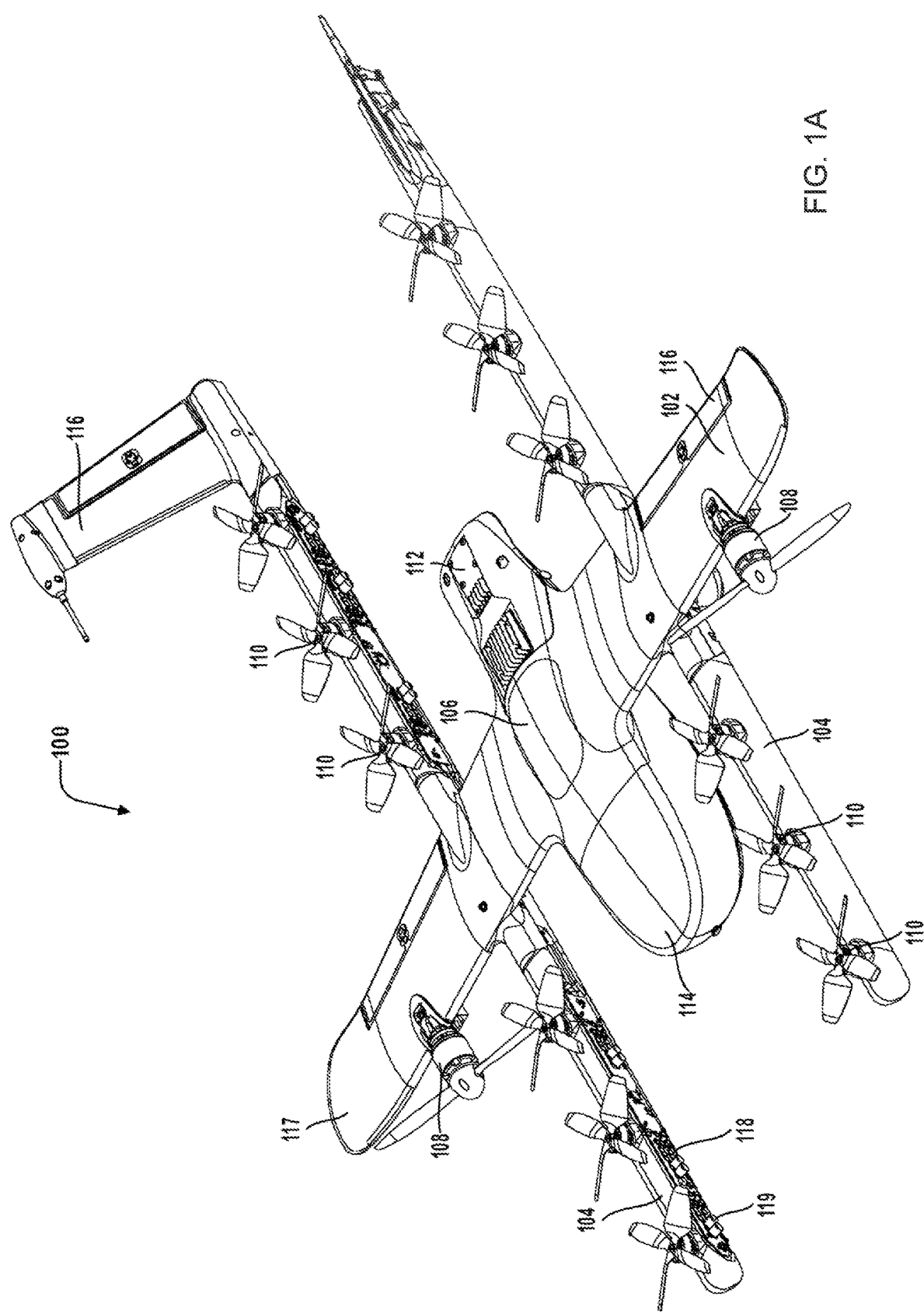
FIG. 1A is a simplified illustration of an unmanned aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments are related to the use of unmanned aerial vehicles (UAVs) or unmanned aerial systems (UASs) (referred to collectively herein as UAVs) that are used to carry a payload to be delivered or retrieved. As examples, UAVs may be used to deliver or retrieve a payload to or from an individual or business. In operation the payload to be delivered is secured to the UAV and the UAV is then flown to the desired delivery site. The payload may be secured beneath the UAV, positioned within the UAV, or positioned partially within the UAV, as the UAV flies to the delivery site. Once the UAV arrives at the delivery site, the UAV may land to deliver the payload, or may be operated in a hover mode while the payload is dropped or lowered from the UAV towards the delivery site using a tether and a winch mechanism positioned within the UAV.

The payload may include a package that encloses goods that are to be delivered by the UAV. The package may protect the goods enclosed therein from weather, dirt, impacts, and other adverse conditions. In some instances, the package may be designed with various features that are intended for securing the package to the UAV. For example, some packages include a handle specifically designed to engage a payload retriever of a UAV. In other instances, the package may have a size and shape that is designed for another purpose, such as shipping or retail display. For example, many packages are in the form of a rectangular box, which is easy to manufacture and can be stored efficiently with other similar boxes. Moreover, many packages are designed without features intended for coupling the package to a UAV.

The present embodiments provide a package coupling apparatus that is configured to be attached to a package and includes structures that can be secured by a component of the UAV, such as a payload retriever. For example, the package coupling apparatus may include one or more straps that are configured to surround the package and a hanger that is configured to be secured by the UAV. The hanger may include a handle with an opening and a bridge that extends over the opening. To secure the hanger to the UAV, the bridge of the handle may be received by the payload retriever of the UAV. Accordingly, with the package secured to the UAV using the payload coupling apparatus, the payload can be safely transported or raised and lowered by manipulating a tether attached to the payload retriever.

To prepare a package for delivery by the UAV, the package coupling apparatus may be positioned on the package with the handle of the hanger extending up from an upper surface of the package. The package coupling apparatus may then be secured to the package by arranging the strap so as to surround the package and secure the hanger to the package. With the package coupling apparatus firmly secured to the package, the payload retriever of the UAV may be hooked onto the handle of the hanger. If a tether that holds the payload retriever is unwound, it may then be retracted using a winch in order to draw the secured package toward the body of the UAV. The package may then be safely transported for delivery.

The package coupling apparatus allows the handle of the hanger to extend upward to an easily accessible position above the upper surface of the package. Accordingly, the handle may be received by a payload retriever on a tether of the UAV, allowing the package to be received, raised toward the UAV for transport, and then lowered for delivery. Moreover, the location of the hanger adjacent to the upper surface of the package allows the package to be transported by the UAV with a relatively short distance between the payload retriever and the package. This allows the package to be secured near the body of the UAV or even inside the UAV. Furthermore, by securing the package coupling apparatus to the package using a strap that surrounds the package, the package coupling apparatus is able to secure packages of various different sizes and shapes to the UAV without adding substantial weight to the overall payload.

While the package coupling apparatus is secured to the package, the hanger is coupled to the strap so that a secure attachment exists between the handle of the hanger and the package. In some embodiments, the hanger may be directly coupled to the strap. Alternatively, in some embodiments, the hanger and strap may be coupled via one or more additional components of the package coupling apparatus. For example, in some embodiments, the package coupling apparatus may include a support structure that holds the hanger in place and that is, in turn, secured to the package by the strap.

In some embodiments, at least a portion of an interior surface of the strap is coated with an adhesive so that ends of the strap may be secured to one another in a loop, or the strap may be adhered directly to a surface of the package. Alternatively, in some embodiments, the strap may extend around the package in a loop and secure the package without adhesive.

In some embodiments, the strap and hanger may be coupled to one another before they are secured to the package. For example, the strap and hanger can be integrally formed in a single piece of material, such as a molded component. Likewise, the components of the package coupling apparatus may be mechanically coupled or adhered to one another before applying the payload coupling apparatus. For example, the strap may be slotted through apertures in the hanger or be secured to the hanger with adhesive. Alternatively, the strap may be coupled to the hanger upon securing the package coupling apparatus to the package. For example, the strap may be routed through apertures in the hanger or adhered over parts of the hanger as the package coupling apparatus is attached to the package.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
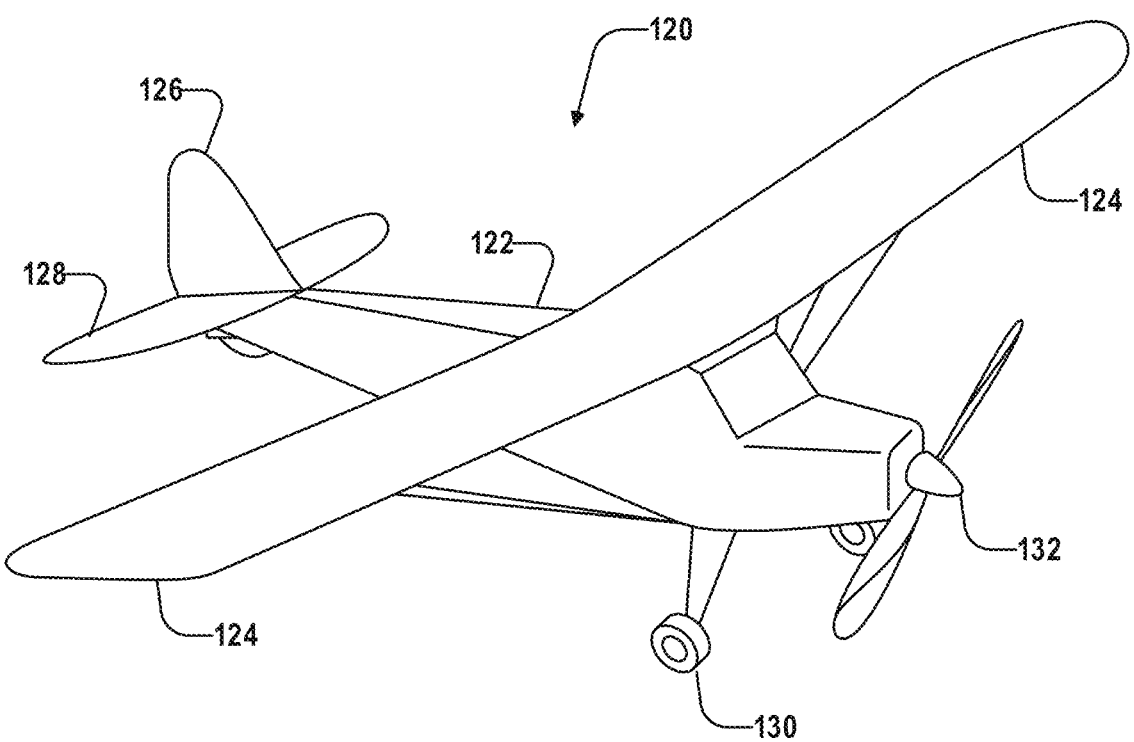
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
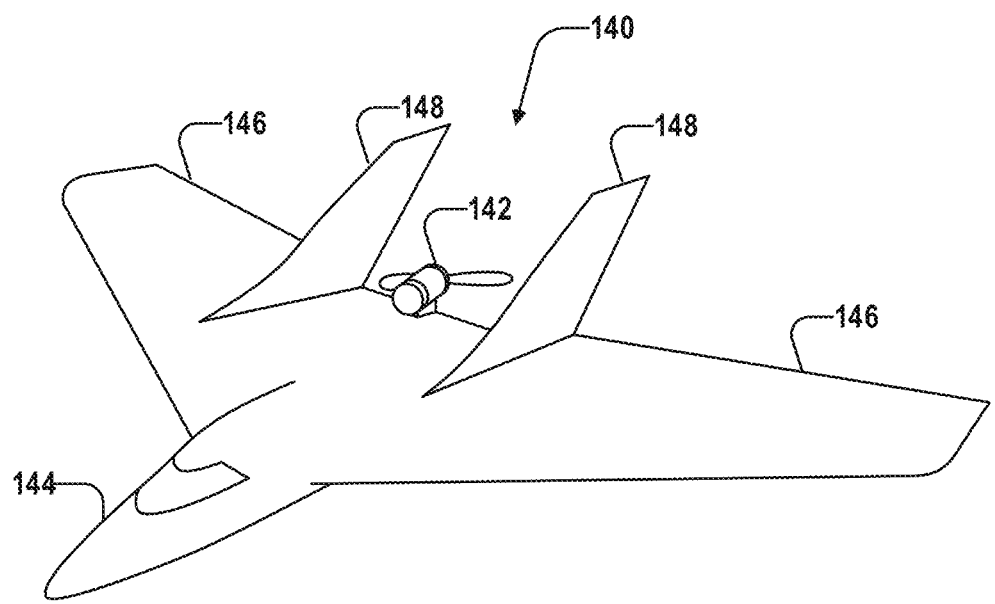
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
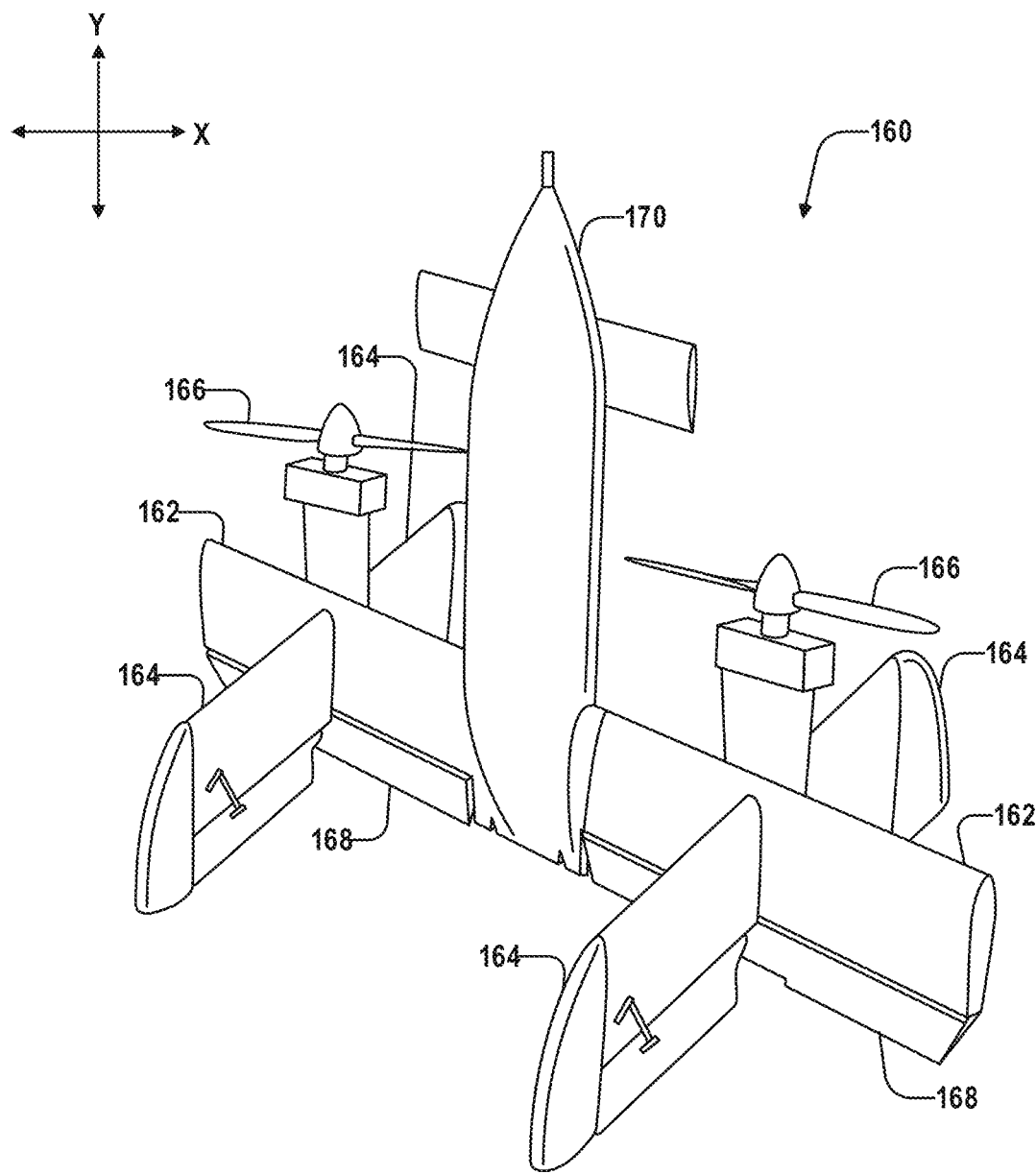
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
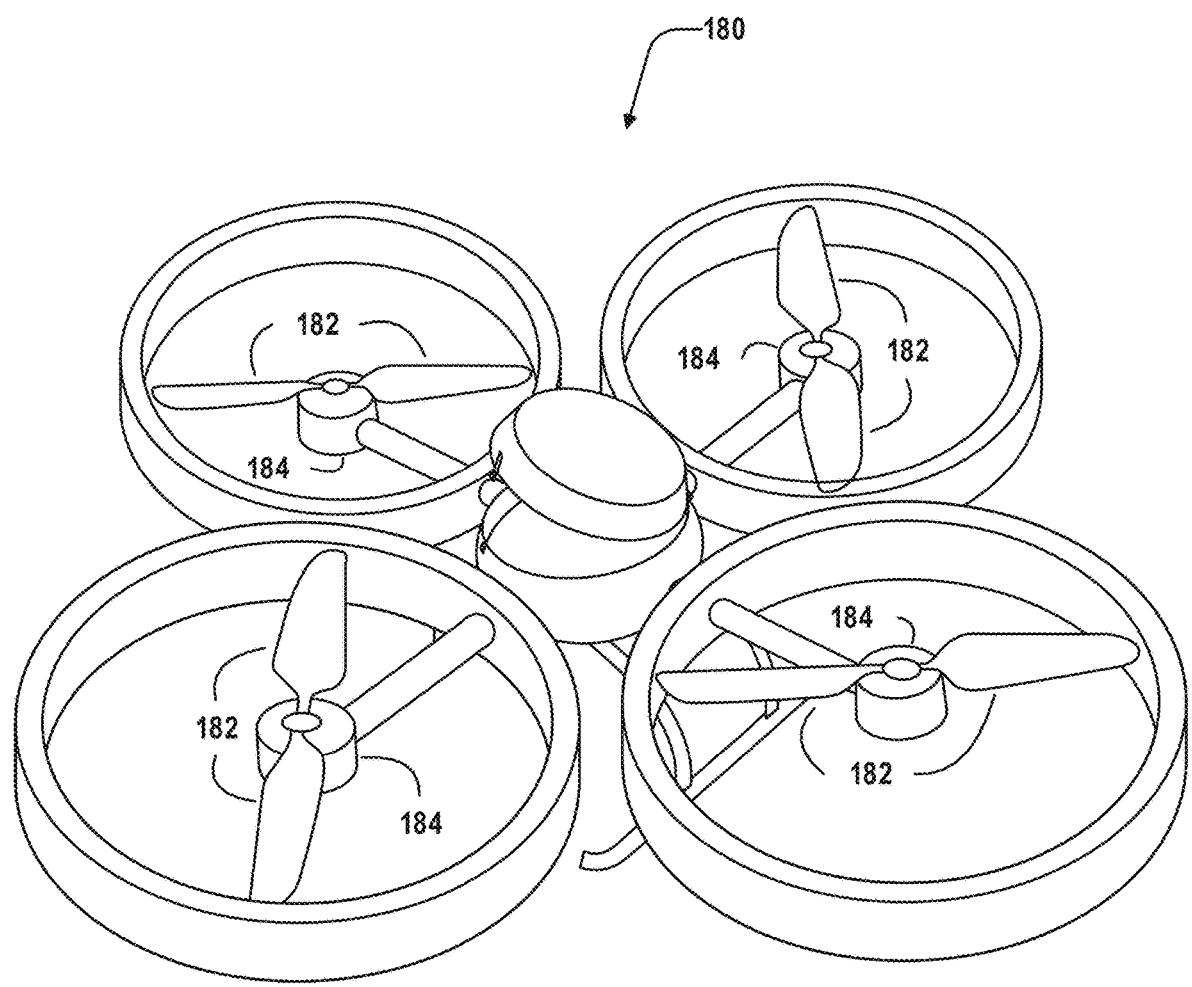
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
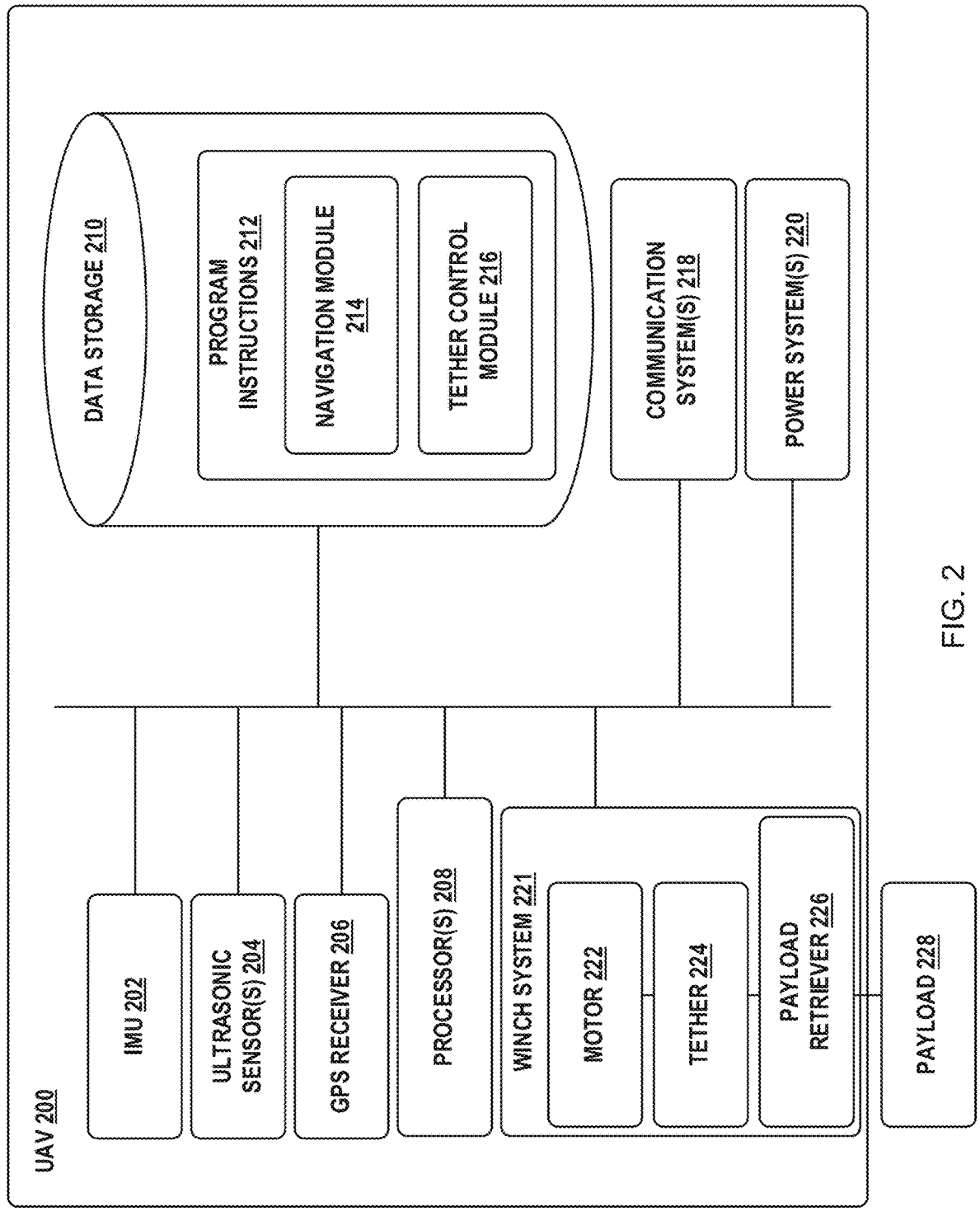
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
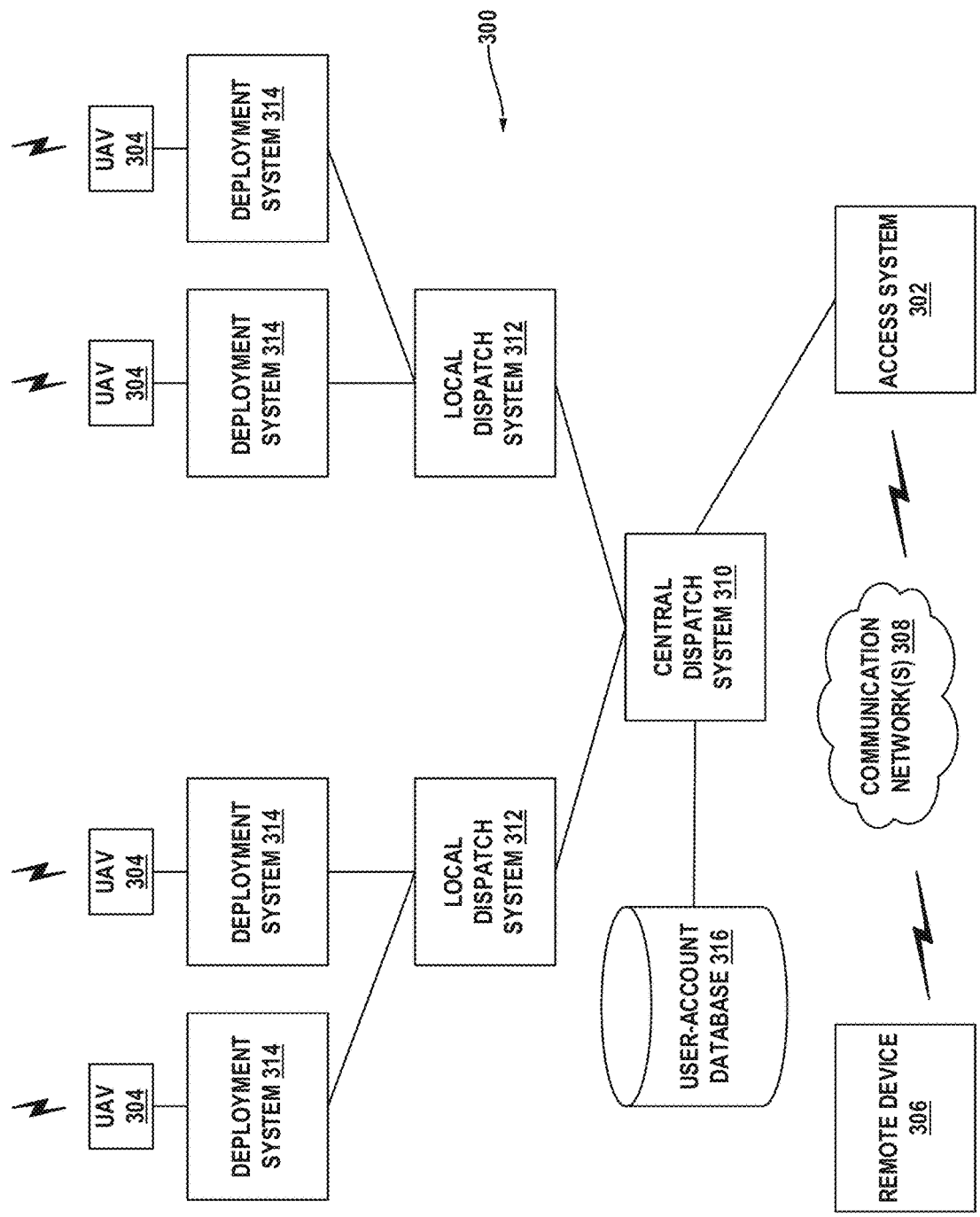
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE PACKAGE COUPLING APPARATUS

Figure 4:
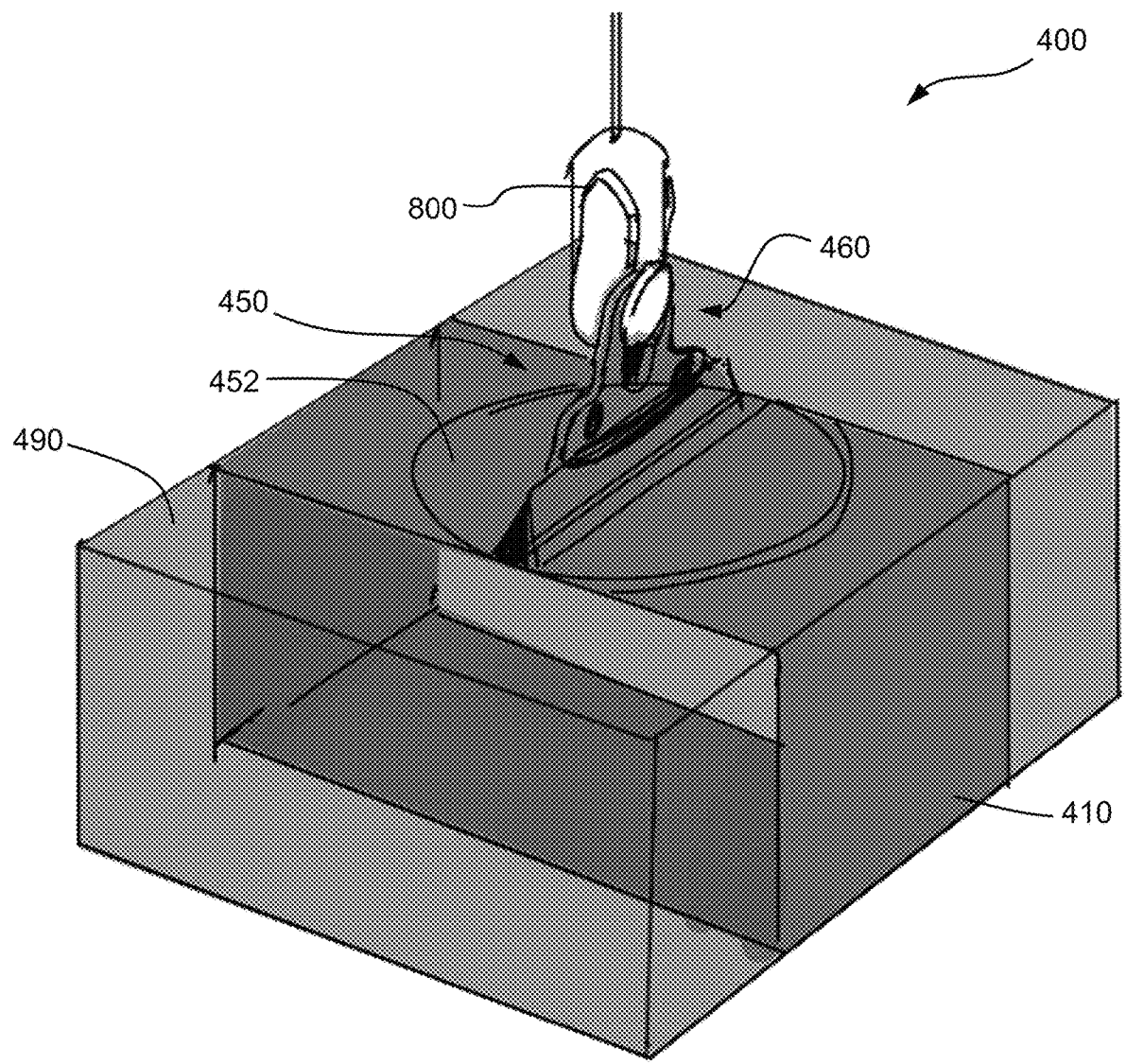
FIG. 4 is a perspective view of an attachment of a package coupling apparatus to a package, according to an example embodiment.

When a UAV is assigned to carry a generic package, which may have any of a range of sizes and shapes, a package coupling apparatus according to the disclosure can be utilized to secure the package to the UAV. The package coupling apparatus may be attached to the package and provide a structure that is configured for interacting with components of the UAV in order to secure the package to the UAV. FIG. 4 illustrates the attachment of such a package coupling apparatus 400 to a package 490. The package coupling apparatus 400 includes a hanger 450 and a strap 410 coupled to the hanger 450. The strap 410 may surround the package 490 in order to secure the package 490 to the hanger 450. The hanger 450 includes a base 452 and a handle 460 extending up from the base 452. The handle 460 may include a handle opening and a bridge that extends over the handle opening, as explained further below. Accordingly, the handle can be received by a payload retriever 800, as shown in FIG. 4, or by another component of the UAV.

The use of a strap in the package coupling apparatus may provide several beneficial characteristics to the package coupling apparatus. First, by arranging the strap to surround the package, the package can be supported from below by the lower portion of the strap, while the package coupling apparatus is supported from above. Accordingly, as shown in FIG. 4, a package coupling apparatus 400 allows a package 490 to be carried by payload retriever 800 that is positioned above the package 490 while the package 490 is being supported from below by the lower portion of the strap 410. Further, by surrounding the package, the strap of the package coupling apparatus can form a secure connection of the package coupling apparatus to the package.

The use of a strap also allows for package coupling apparatus to be adapted for attachment to packages of a wide range of sizes and shapes. The flexibility of the strap allows the package coupling apparatus to surround the package regardless of the dimensions of the package. Thus, such a package coupling apparatus may be used for boxes and packages of a variety of different shapes.

Figure 5:
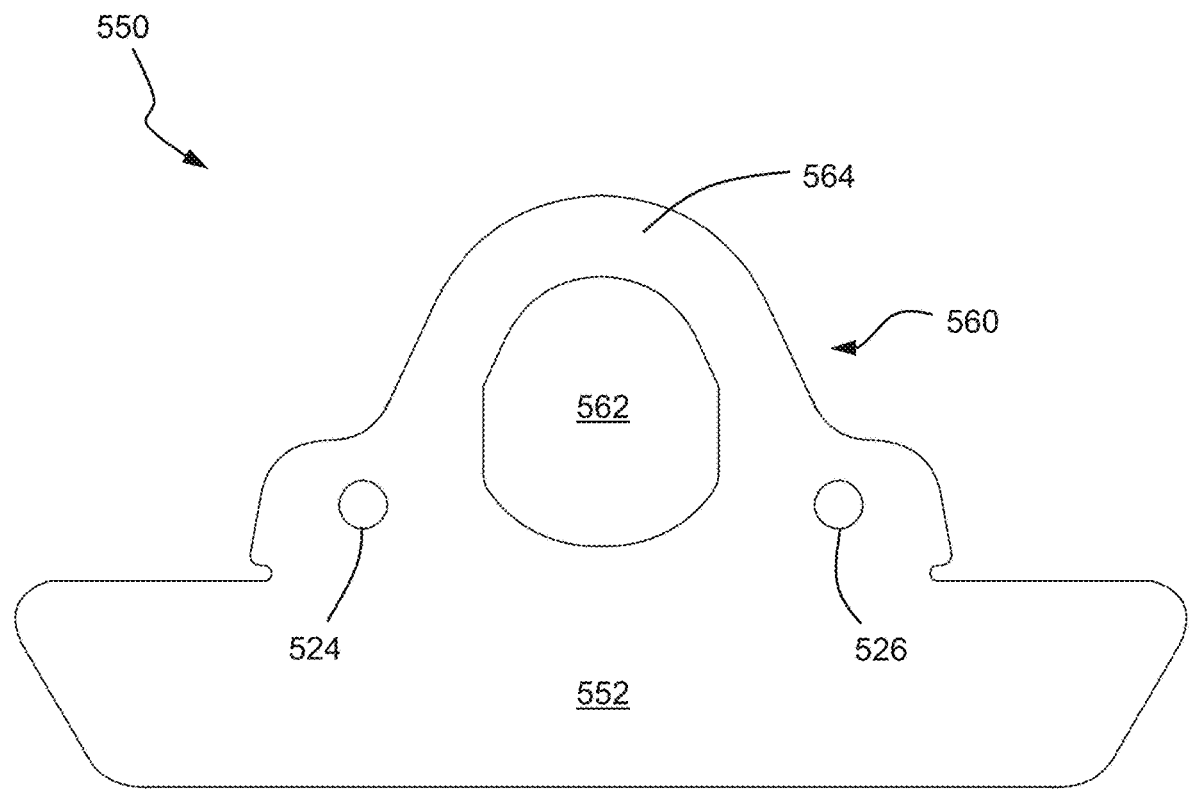
FIG. 5 is a side view of a hanger of a package coupling apparatus, according to an example embodiment.

FIG. 5 is a side view of a hanger 550 configured to be secured to a strap to form a package coupling apparatus according to an embodiment of the disclosure. The hanger 550 may include a handle 560 formed by a bridge 564 that extends over a handle opening 562. In addition, the hanger 550 may also include a base 552 that extends past the ends of the handle 560 and is configured to couple the hanger 550 to a support structure coupled to a strap. The hanger 550 may also include holes 524, 526 that are configured to receive locking pins for securing the package coupling apparatus and any associated package. For example, the holes 524 and 526 may be configured to receive locking pins positioned within the fuselage of a UAV to secure the hanger 550 and payload in a secure position during high speed forward flight to a delivery location. In addition, holes 524 and 526 may also be designed for pins of a payload holder to extend therethrough to hold the payload in position for retrieval on a payload retrieval apparatus. The hanger may be comprised of a thin, plastic material that is flexible and provides sufficient strength to suspend the payload beneath a UAV during forward flight to a delivery site, and during delivery and/or retrieval of a payload. In practice, the hanger may be bent to position the handle within a slot of a payload retriever.

The example hanger 550 shown in FIG. 5 includes a larger handle opening 562 for a payload retriever and two smaller holes 524, 526 for locking pins, as described in more detail below. In other embodiments, however, the hanger may include fewer or more apertures. For example, in some embodiments, the hanger may include only a single larger handle opening that is sized for a payload retriever. In such a case, a payload retriever may be configured to receive the handle in order to raise and lower a package with respect to a UAV. The payload retriever alone may be used to secure the package to the UAV, or the payload retriever may be used in cooperation with other structures, such as clamps or doors, to secure the package to the UAV. Alternatively, in some embodiments, the handle opening may be sized to receive a locking pin, and the hanger may not include a larger opening for a payload retriever. In such an embodiment, the UAV may be configured to land to receive a package and either land or drop a package for delivery. For example, such an embodiment may have a configuration similar to that of FIG. 5, with two small holes but without the larger opening. Accordingly, either of the holes may form the handle opening and the material extending over the opening may form the bridge of the handle.

FIG. 6A is a perspective view of a payload retriever 800, according to an example embodiment. Payload retriever 800 includes tether mounting point 802, and a slot 808 to receive a handle of the package coupling apparatus. Lower lip, or hook, 806 is positioned beneath slot 808. Also included is an outer protrusion 804 having helical cam surfaces 804a and 804b that are adapted to mate with corresponding cam mating surfaces within a payload retriever receptacle positioned within a fuselage of a UAV.

FIG. 6B is a side view of payload retriever 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the package coupling apparatus after it has been decoupled, or will not get engaged with power lines or tree branches during retrieval to the UAV.

FIG. 6C is a front view of payload retriever 800 shown in FIGS. 6A and 6B. Lower lip or hook 806 is shown positioned beneath slot 808 that is adapted for securing a handle of a payload, such as on a package coupling apparatus of the disclosure.

Figure 7A:
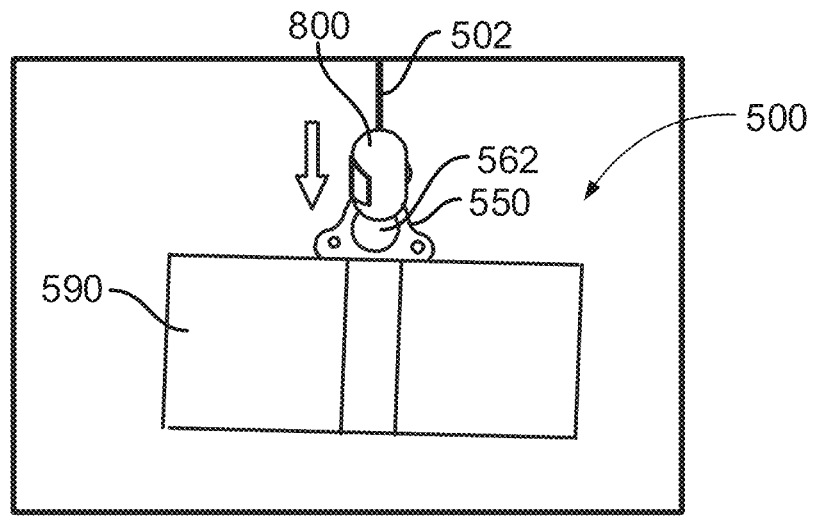
FIGS. 7A-7C show decoupling of a payload retriever from a package coupling apparatus, according to an example embodiment.

FIG. 7A shows a side view of a package coupling apparatus 500 secured to a package 590 with a hanger 550 secured within a payload retriever 800 as the package 590 moves downwardly prior to touching down for delivery. Prior to payload touchdown, the hanger 550 of package coupling apparatus 500 includes a handle opening 562 through which a lower lip or hook of payload coupling apparatus 800 extends. The handle sits within a slot of the payload retriever 800 that is suspended from a tether passing through tether mounting point 802 of payload retriever 800 during descent of the package 590 to a landing site.

Figure 7B:
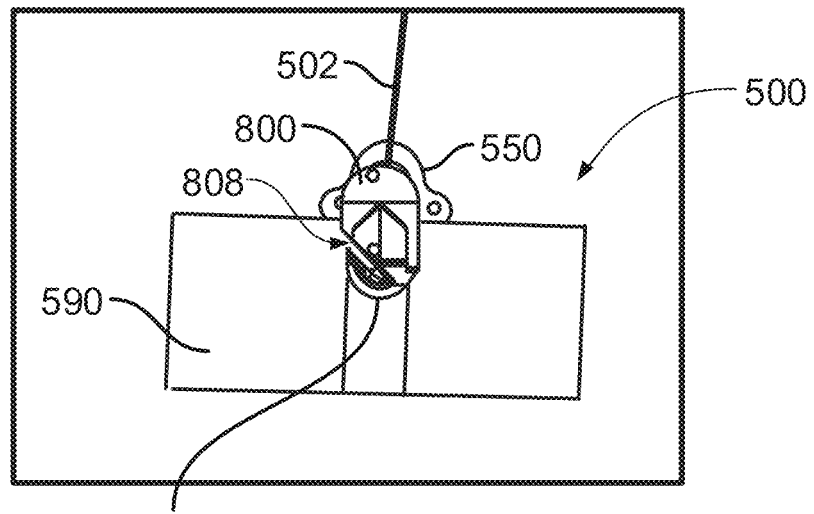

FIG. 7B shows a side view of package coupling apparatus 500 after package 590 has landed on the ground showing payload retriever 800 decoupled from hanger 550 of package coupling apparatus 500. Once the package 590 touches the ground, the payload coupling apparatus 800 continues to move downwardly (as the winch further unwinds) through inertia or gravity and decouples the hanger 550 from the slot 880 of the payload retriever 800 from hanger 550. The payload retriever 800 remains suspended from tether 502, and can be winched back up to the payload coupling receptacle of the UAV.

Figure 7C:
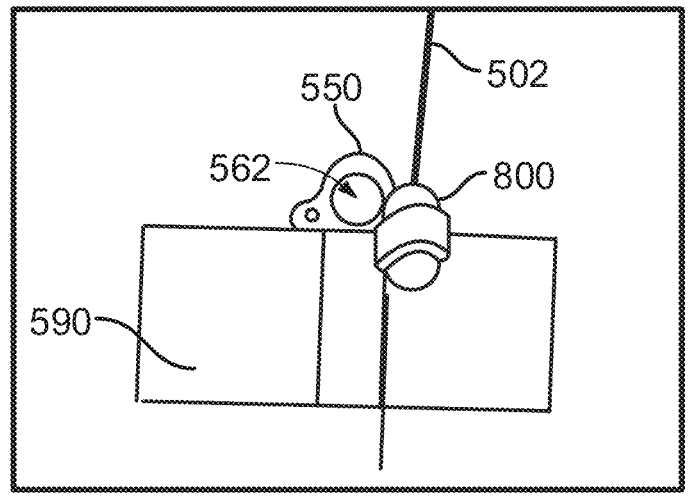

FIG. 7C shows a side view of payload delivery apparatus 500 with payload retriever 800 moving away from hanger 550 of package coupling apparatus 500. Here the payload retriever 800 is completely separated from the handle opening 562 of hanger 550. Tether 502 may be used to winch the payload retriever back to a receptacle positioned in the fuselage of the UAV.

Figure 8:
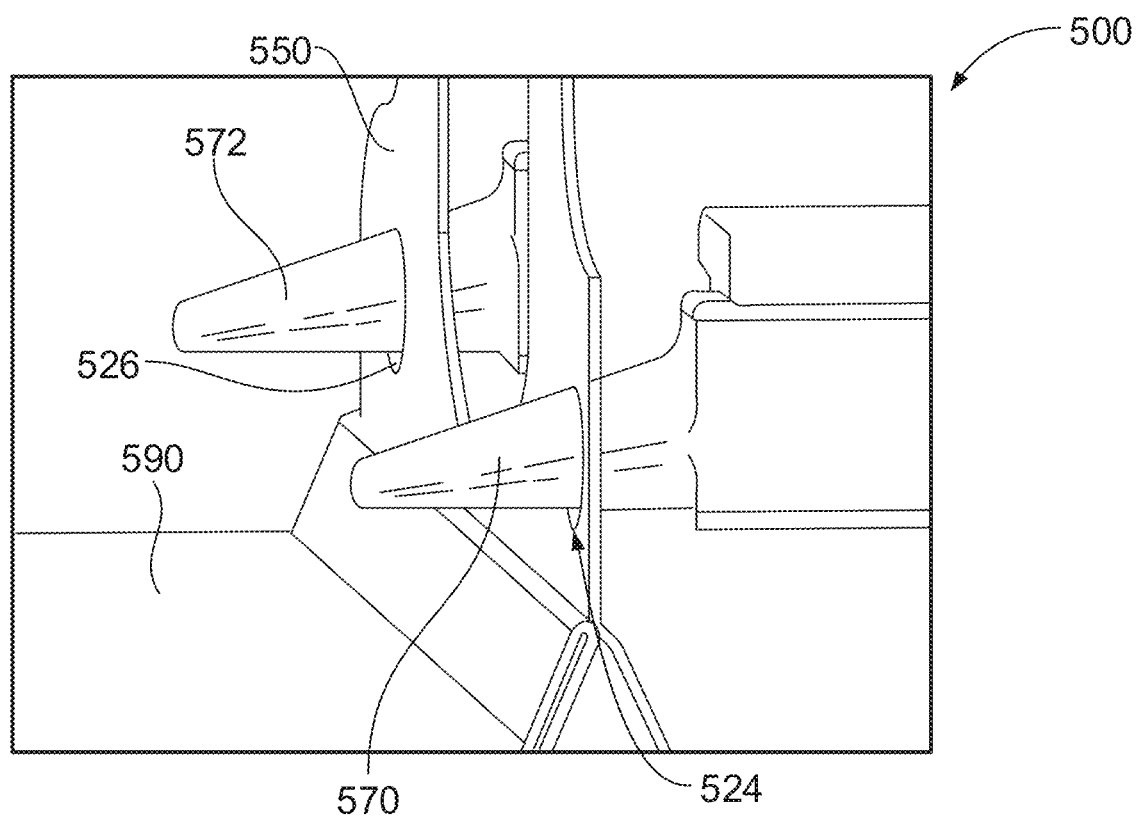
FIG. 8 shows a pair of locking pins extending through a hanger of a package coupling apparatus, according to an example embodiment.

FIG. 8 shows a pair of pins 570, 572 extending through holes 524 and 526 in hanger of package coupling apparatus 500 to secure the hanger 550 and top portion of a package within the fuselage of a UAV, or to secure package 590 to a payload holder of a payload retrieval apparatus. In this manner, the hanger 550 and package 590 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the hanger 550 of package 590, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

In some embodiments, the package coupling apparatus may include a support structure that is configured to engage the surface of a package and hold the hanger in place. Such a package coupling apparatus 900 is shown in FIGS. 9A-9C.

Figure 9A:
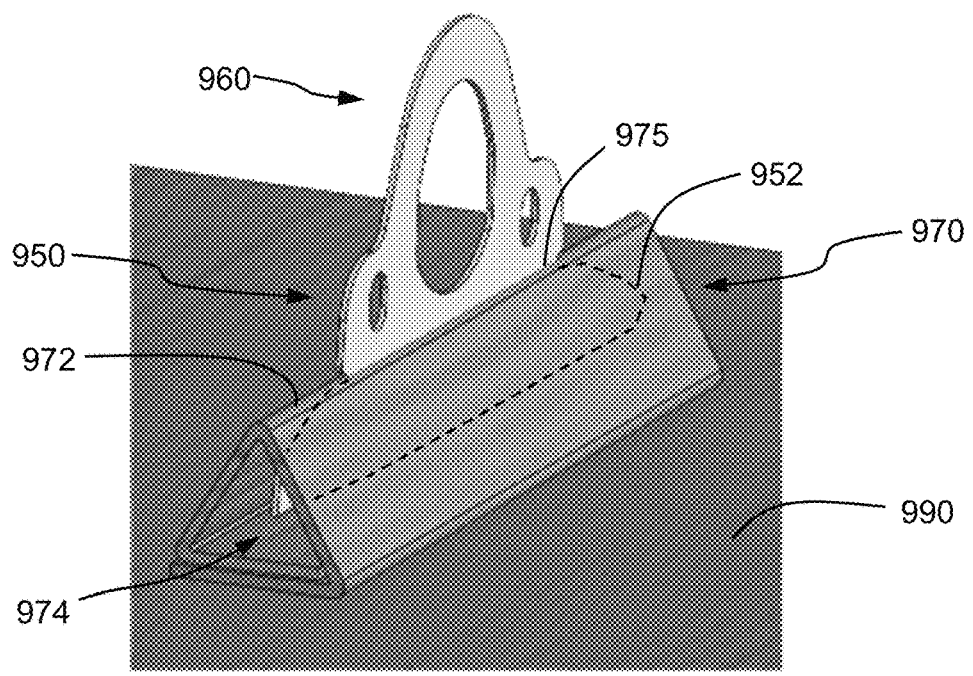
FIG. 9A is a perspective view of a hanger of a package coupling apparatus placed on a package, according to an example embodiment.

As shown in FIG. 9A, hanger 950 may be formed as a flat tab, similar to the hanger 550 shown in FIG. 5, with a flat base 952 that extends in the same plane as a handle 960. In order to secure the hanger 950 to a package 990, the hanger 950 may be coupled to a support structure 970 that holds the base 952. For example, the support structure 970 may include an interior space 974 for receiving the base 952 and an aperture 975 extending through a peak 972 of the support structure. Accordingly, the base 952 of the hanger can be retained within the support structure 970 while the portion of the hanger 950 that includes the handle 960 extends through the aperture 975. When the support structure 970 is positioned against a package 990, as shown in FIG. 9A, the handle 960 of the hanger 950 may extend upward from the peak 972 of the support structure 970 for connection to a payload retriever or other component of a UAV.

Figure 9B:
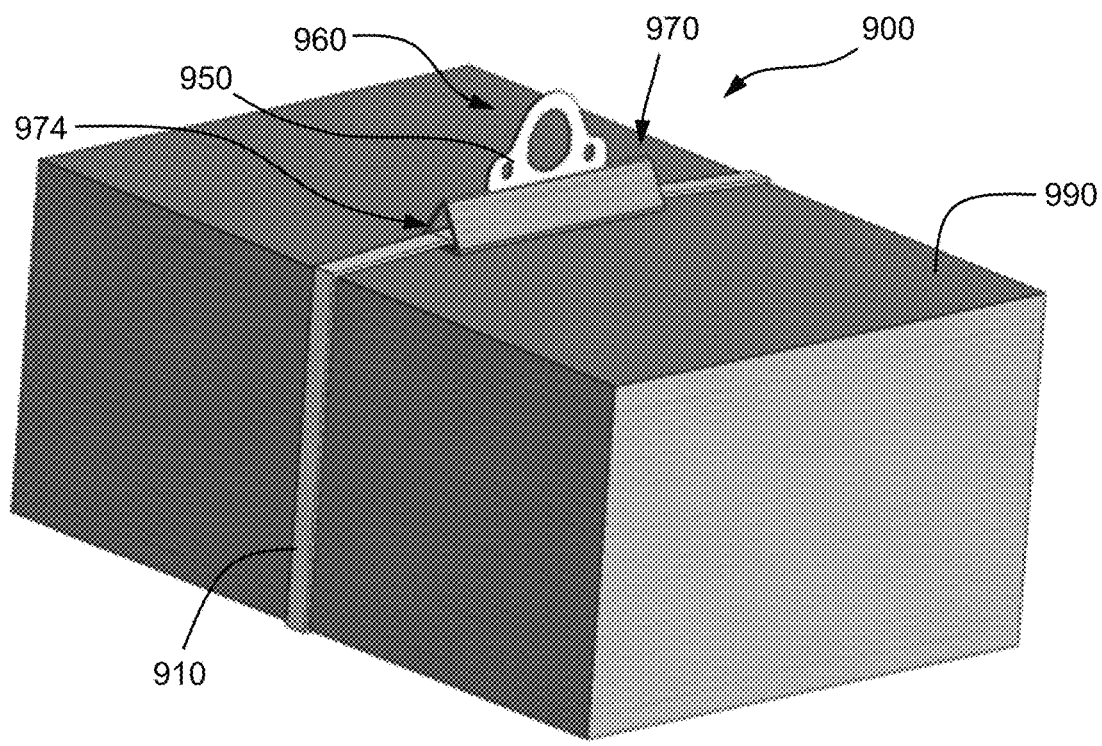
FIG. 9B shows the hanger of FIG. 9A secured to a package using one strap.
Figure 9C:
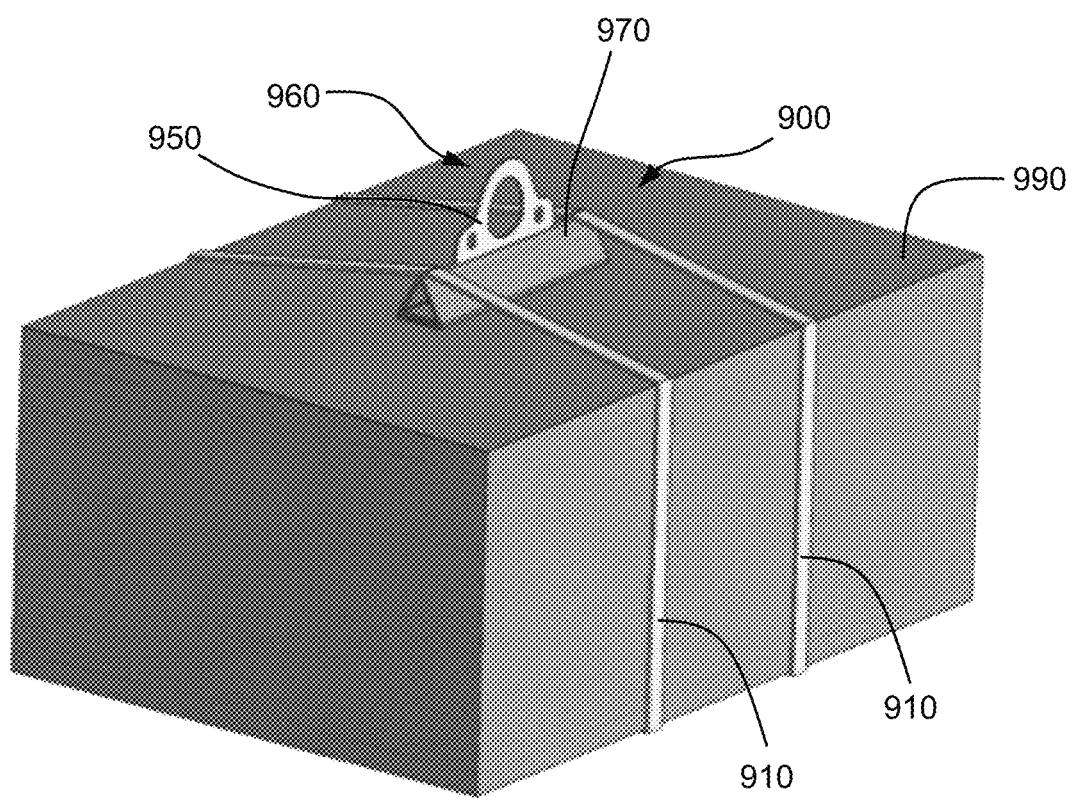
FIG. 9C shows the hanger of FIG. 9B secured to a package using two straps.

With the support structure 970 in place, the package coupling apparatus 900 can be secured on the package 990 using a strap 910, as shown in FIG. 9B or 9C. For example, in FIG. 9B, a single strap 910 extends through the interior space 974 of support structure 970 and around the exterior surface of package 990 so as to secure the support structure 970 to the upper surface of the package 990. On the other hand, in FIG. 9C, two straps 910 extend over the support structure 970 on either side of handle 960 of hanger 950. From the support structure 970, each of the straps 910 loops around the package 990 to hold the support structure 970 securely against the package 990.

Figure 10A:
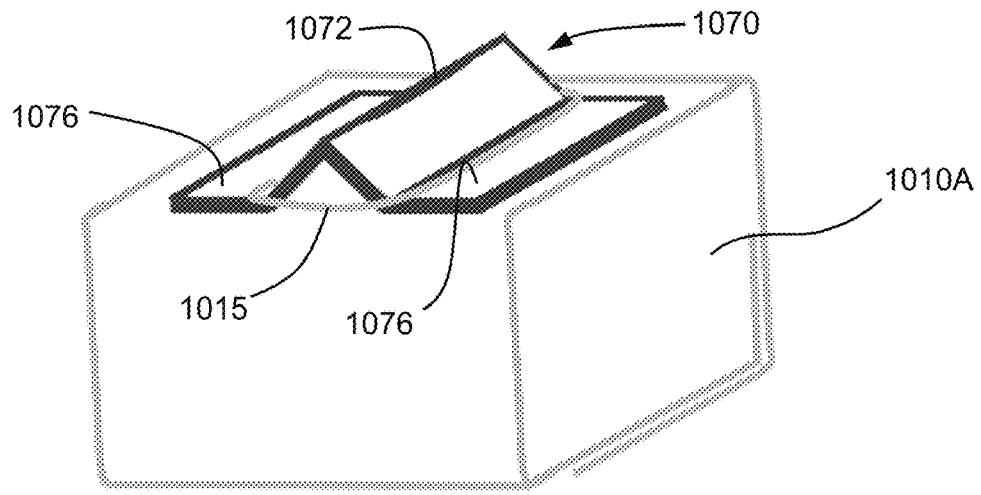
FIG. 10A is a perspective view of a package coupling apparatus, according to an example embodiment.
Figure 10B:
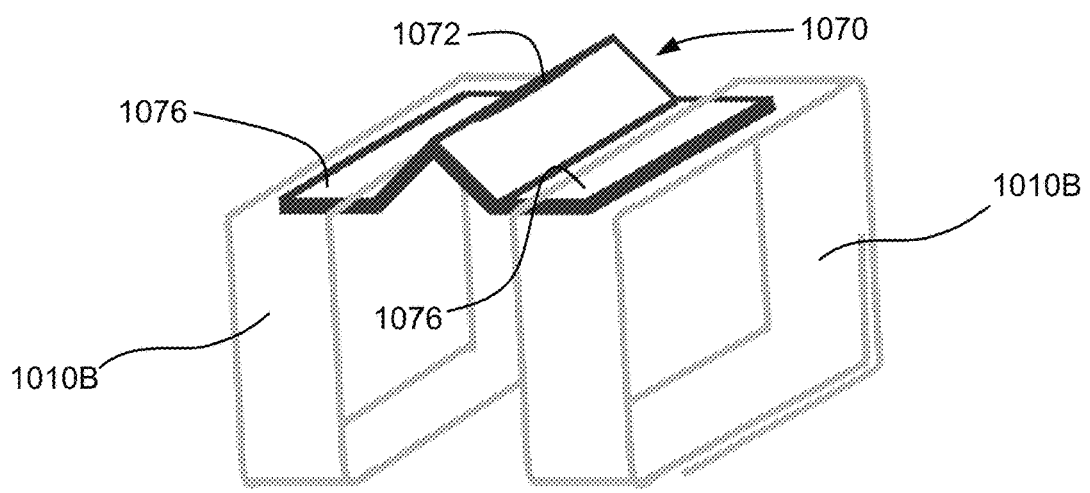
FIG. 10B is a perspective view of a package coupling apparatus, according to an example embodiment.
Figure 10C:
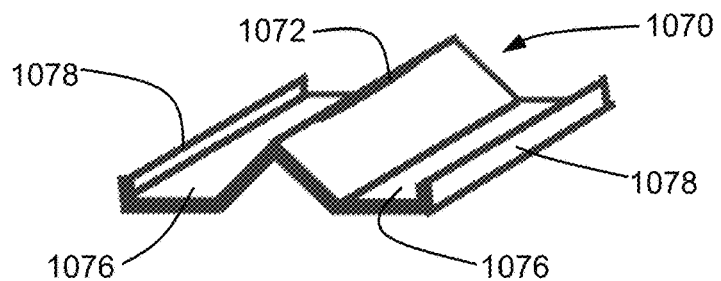
FIG. 10C is a perspective view of a portion of a package coupling apparatus, according to an example embodiment.

FIGS. 10A-10C illustrate other configurations of a support structure and associated strap of a package coupling apparatus. As shown in FIG. 10A, the support structure 1070 may include a central peak 1072 and two feet 1076 disposed on either side of the central peak 1072. The feet 1076 may be configured to engage the surface of a package and secure the support structure 1070 against the package. For example, one or more straps may then be used to cover the feet 1076 so as to hold the support structure 1070 securely against a package. For example in FIG. 10A, a single strap 1010A is used to secure both feet 1076. The single strap 1010A may include an aperture 1015 to accommodate the central peak 1072. Alternatively, as shown in FIG. 10B, separate straps 1010B may be used to secure each foot 1076 to a package. In some embodiments, as shown in FIG. 10C, each of the feet 1076 may include a guide rail 1078 opposite the central peak 1072 that extends upward from the outer edge of the respective foot 1076. Each of the guide rails 1078 may provide a groove in the support structure 1070 that helps inform a user of the appropriate position for the strap. Further, the guide rails 1078 can also be helpful in preventing the strap or straps from sliding off the support structure 1070.

The central peak 1072 of the support structures 1070 shown in FIGS. 10A-10C may provide a space for receiving a hanger that is formed as a separate component. Accordingly, the support structure 1070 can be used to help secure the hanger to the package without a direct attachment of the hanger to the package.

Figure 11A:
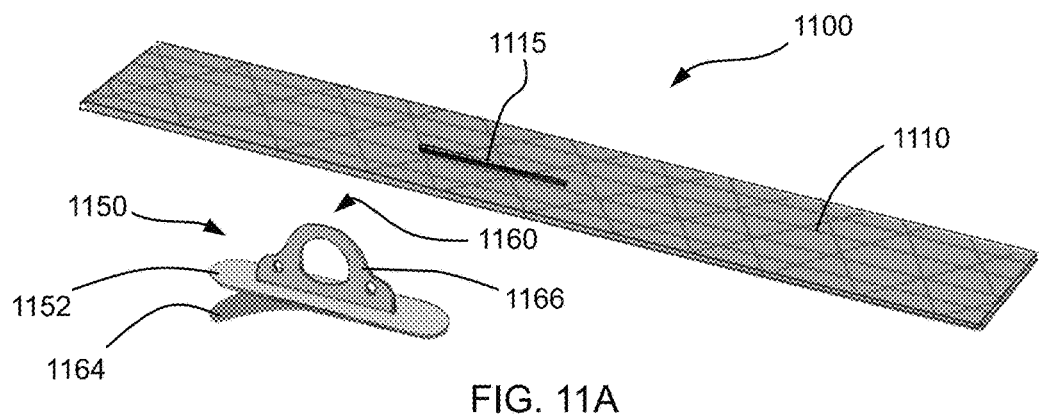
FIG. 11A is a perspective view of components of a package coupling apparatus, according to an example embodiment.

Alternatively, in some embodiments, the base of the hanger may be configured to engage the surface of the package directly. For example, FIG. 11A shows a package coupling apparatus 1100 including a hanger 1150 that attaches directly to a package and a strap 1110 that is configured to secure the hanger 1150 to the package. The hanger 1150 includes a tab 1166 that forms the handle 1160 and a base 1152 that extends laterally outward from the tab 1166. The base 1152 is configured to engage the surface of a package. For example, FIG. 11B shows the hanger 1150 positioned with its base 1152 placed against a package 1190 and the tab 1166 that forms the handle 1160 extending upward from the package 1190.

In some embodiments, components of the package coupling apparatus may be secured to the package using an adhesive coating. For example, as shown in FIG. 11A, the bottom surface of base 1152 of hanger 1150 is coated with an adhesive and covered with a removable backer 1164. The backer 1164 may be used to protect the adhesive coating until the hanger 1150 will be attached to the package 1190. At that time, the backer 1164 may be removed to expose the adhesive, which can be used to secure the hanger 1150 to the package 1190, as shown in FIG. 11B. Likewise, the strap 1110 may be formed as an adhesive tape with an adhesive coating on an interior surface of the tape 1110. With the hanger 1150 in place on the package 1190, as shown in FIG. 11B, the adhesive tape 1110 may then be positioned so that the tab 1166 of the hanger 1150 passes through an aperture 1115 that is formed as a slot in the adhesive tape 1110. The adhesive tape 1110 may then be arranged to surround the package 1190 and may be secured to the surface of the package 1190. With the base 1152 of hanger 1150 positioned under the strap 1110 of tape, the hanger 1150 of the assembled package coupling apparatus 1100 is further secured to the package 1190.

Figure 11B:
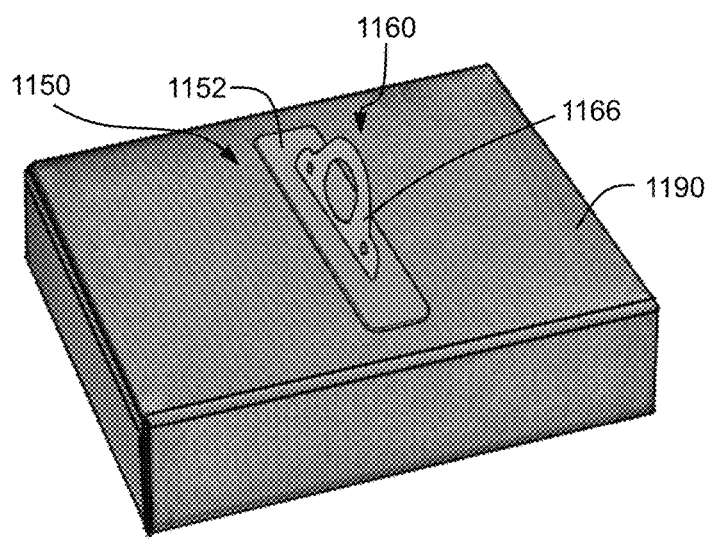
FIG. 11B is a perspective view of a hanger of the package coupling apparatus of FIG. 11A secured to a package.
Figure 11C:
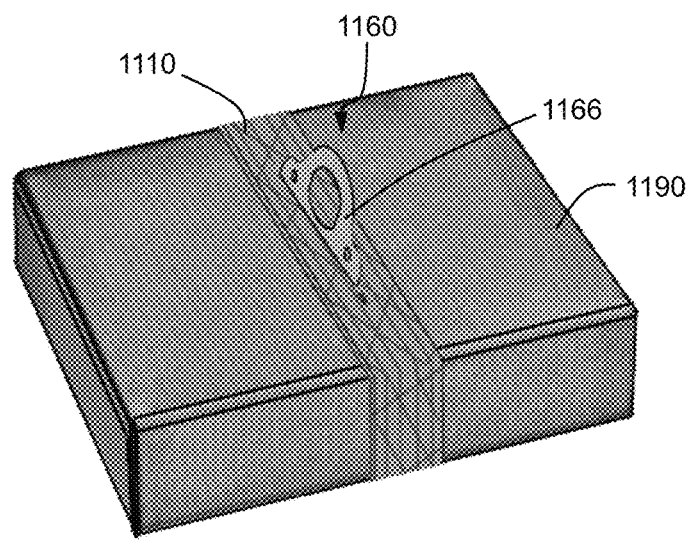
FIG. 11C is a perspective view of the package coupling apparatus of FIG. 11A secured to the package.
Figure 12A:
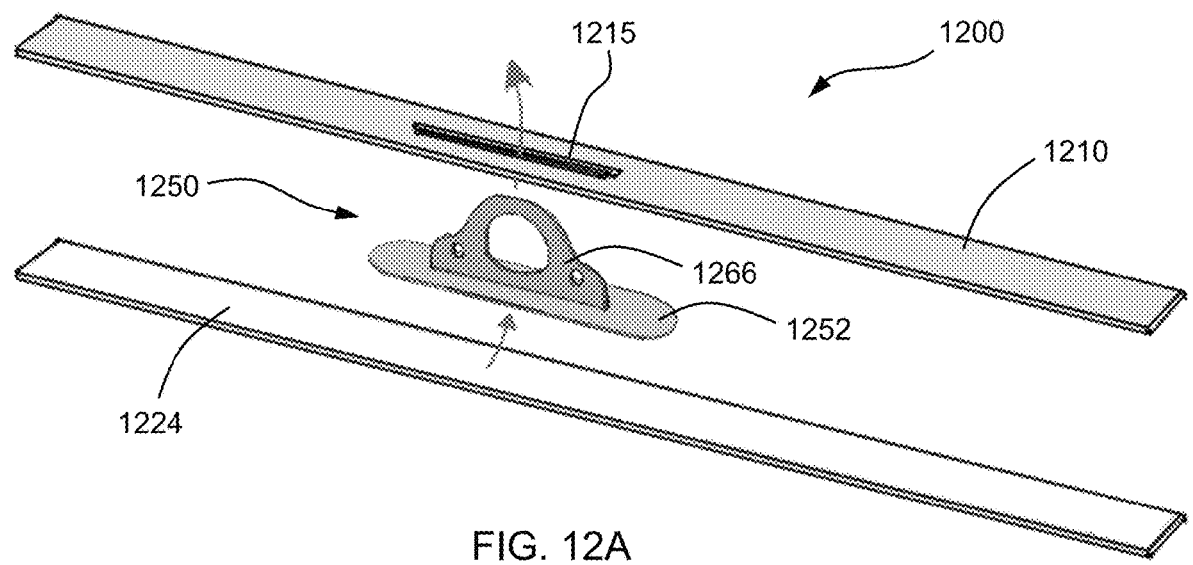
FIG. 12A is a perspective view of components of a package coupling apparatus, according to an example embodiment.
Figure 12B:
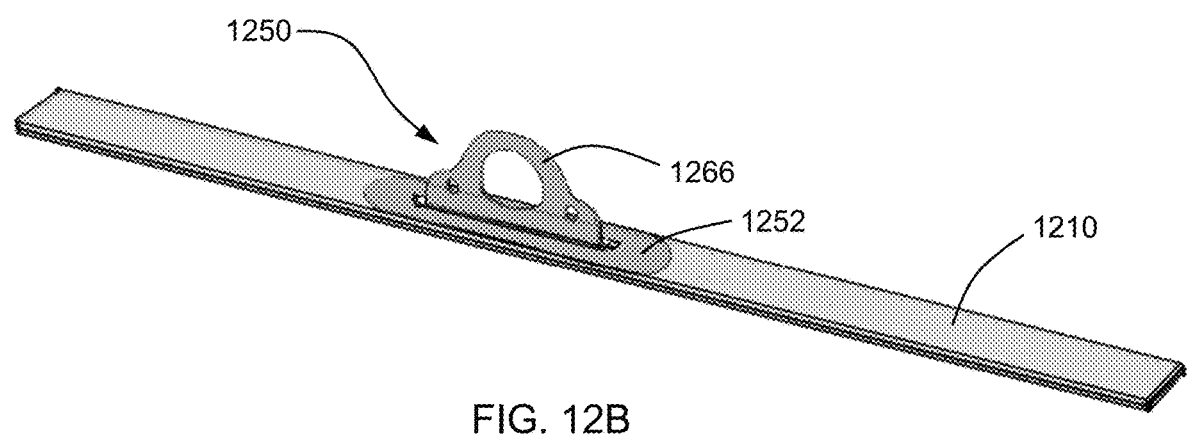
FIG. 12B is a perspective view of the components of FIG. 12A assembled together.

While the hanger 1150 and adhesive tape 1110 of FIGS. 11A-11C are individually placed onto the package in separate steps, in other embodiments, the hanger and strap may be attached to one another before application on the package. For example, FIGS. 12A and 12B show a package coupling apparatus 1200 that is pre-assembled. The tab 1266 of a hanger 1250 is inserted through an aperture 1215 in an adhesive tape 1210 such that the base 1252 of the hanger 1250 is secured to the tape 1210. A removable backer 1224 may then be placed over the rear surface of the base 1252 of the hanger 1250 and the remaining exposed adhesive. Prior to installation on a package, the backer 1224 may be removed and the pre-assembled package coupling apparatus 1200 can be secured to the package in a single step.

Figure 13A:
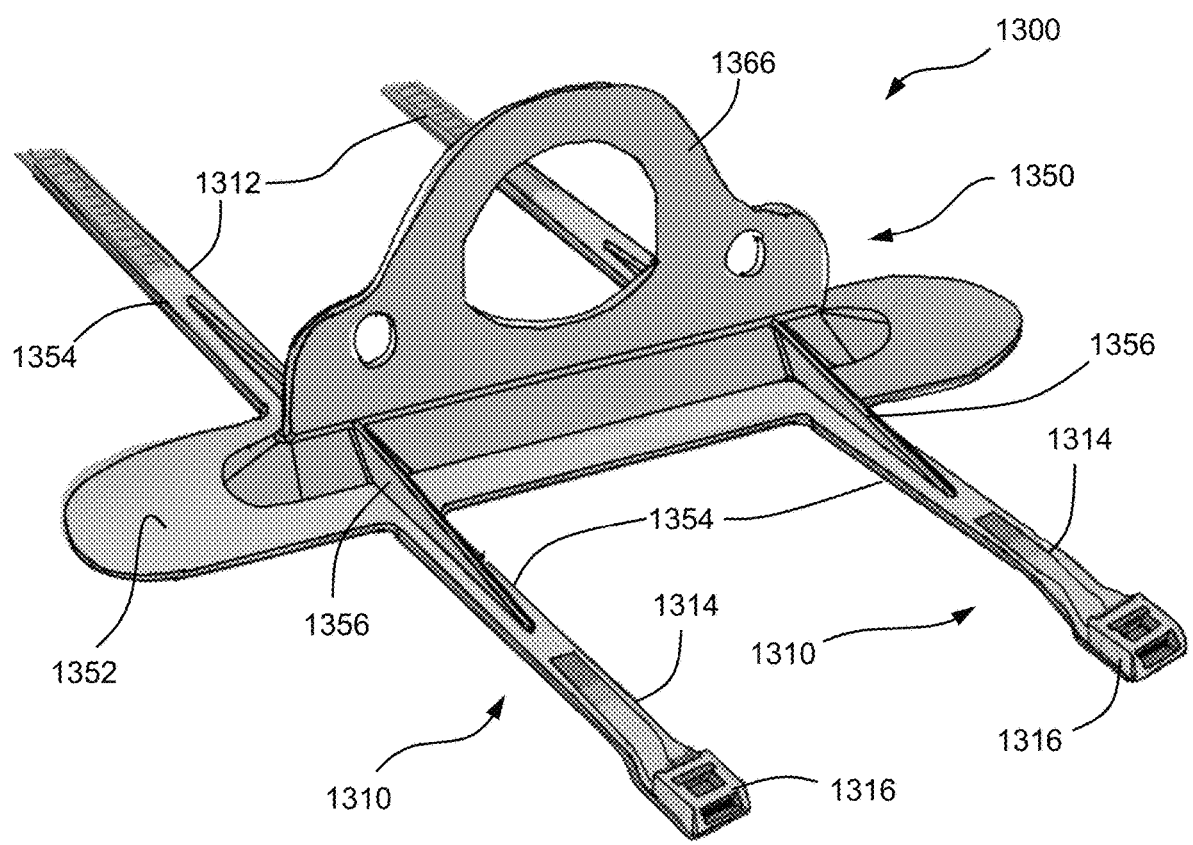
FIG. 13A is a perspective view of a portion of a package coupling apparatus, according to an example embodiment.
Figure 13B:
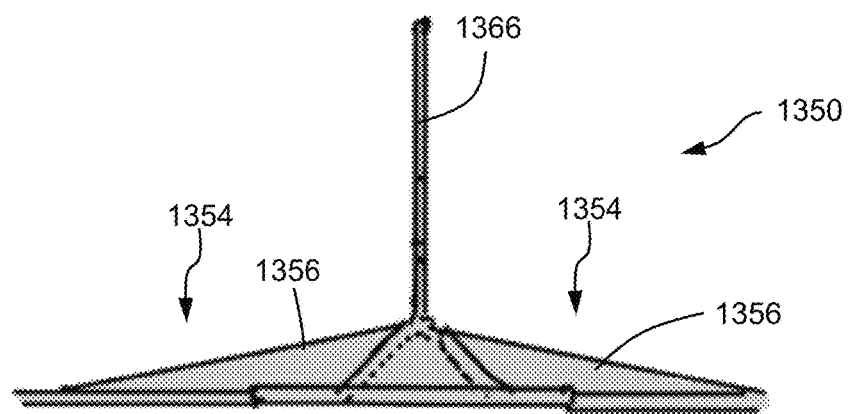
FIG. 13B is a side view of a portion of the package coupling apparatus of FIG. 13A.

Further still, in some embodiments, the hanger and strap may be integrally formed in a single piece. For example, in some embodiments the package coupling apparatus, including both the hanger and one or more straps, may be formed in a single mold of one material. For example, FIGS. 13A and 13B show a package coupling apparatus 1300 that includes a hanger 1350 with a base 1352 and portions of two straps 1310 that are integrally formed with the base 1352. Each of the straps 1310 is formed by a first portion 1312 and a second portion 1314 that respectively extend from opposing sides of the base 1352. The two strap portions 1312, 1314 may be configured to form a loop around a package and attach to one another so as to surround the package.

For example, in some embodiments, the first portion 1312 of each strap 1310 may include a row of teeth and the second portion 1314 may include a latch 1316 configured to engage the teeth. For example, in some embodiments, the teeth and latch 1316 may have a similar form as a cable tie, where latch includes a head with a pawl in the head and the teeth are formed by a row of angle surfaces that engage the pawl so as to form a ratchet.

In some embodiments the base 1352 of the hanger 1350 includes projections 1354 that extend outward from the tab 1366 and the strap portions 1312, 1314 may extend further outward from the projections 1354. Such projections 1354 may provide the base 1352 with a larger footprint, and may also add stability to the hanger 1350.

In some embodiments, the package coupling apparatus may include features that help limit tenting or mitigate the impact of tenting at the top of the package. When a package is supported from above, such as when hung from a UAV, the force at the top of the package can cause the package or a combination of the package and coupling apparatus to deform or bend upward at the attachment point. For example, if the package or coupling apparatus is supported in the middle, the upward force will cause the opposing sides of the package or coupling apparatus to angle upward toward the attachment point thereby causing tenting at the top of the package.

With certain attachment configurations, it may not be possible to entirely avoid tenting at the top of the package. However, limiting tenting or mitigating the impact of tenting may be desirable. First, tenting at the top of the package results in an increase in the overall height of the package, which, as stated above, increases drag. Moreover, unexpected tenting at the top of the package may sometimes even result in damage to the package. For example, in some instances, when the upward bend or tenting at the top of the package is extensive, the sidewalls of the package may collapse inward damaging the package and potentially the contents of the package.

In some embodiments, the hanger may include features that provide tenting relief by directing the tension in the strap in an upward direction toward the handle of the hanger. Such features may include elevated supports for the strap, so that the strap is designed to angle upward from the corners of the package, or an angled brace that in line with the strap that directs the tension in an upward direction. By intentionally directing the tension upward from package corner toward the handle, these features can limit the amount of unforeseen tenting, which could damage the package or increase drag. For example, as shown in FIGS. 13A and 13B, the projections 1354 of base 1352 may include braces in the form of triangular ribs 1356 that direct the tension upward toward the tab 1366 at the center of hanger 1350.

Figure 14A:
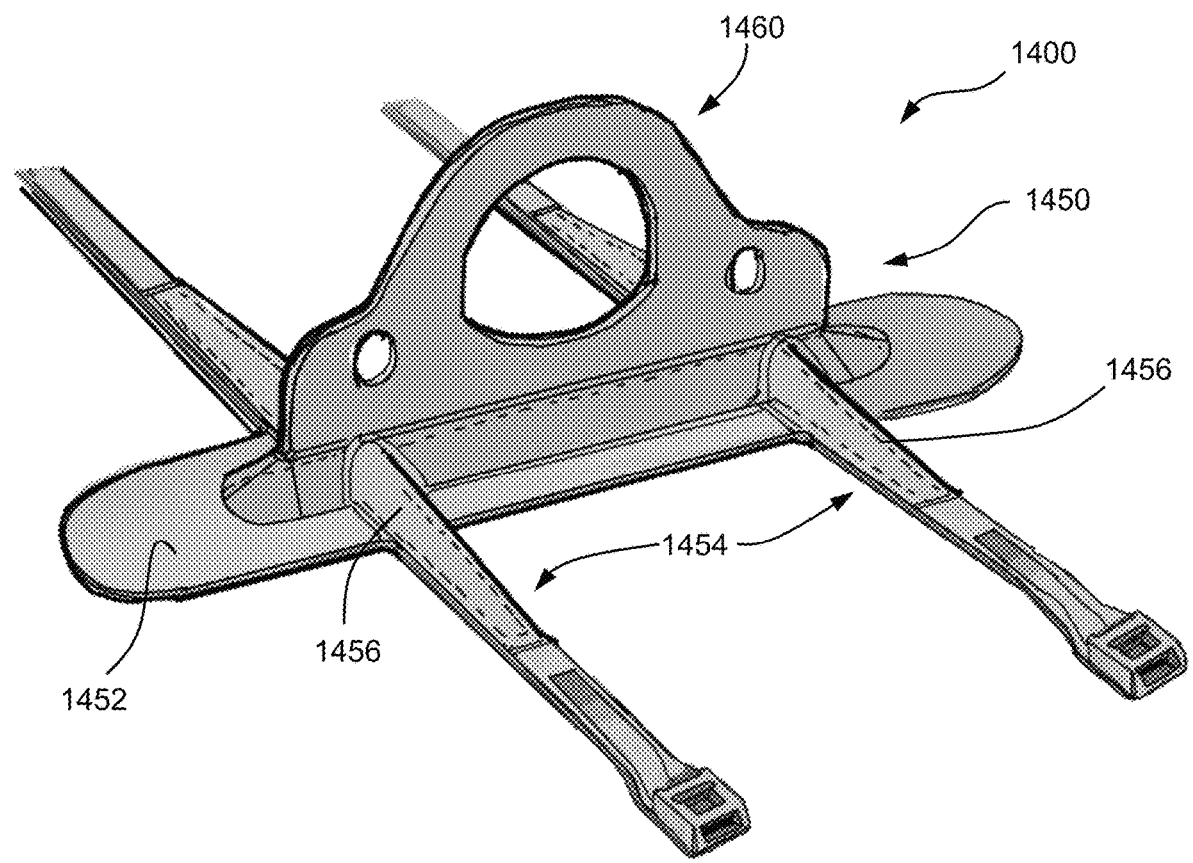
FIG. 14A is a perspective view of a portion of a package coupling apparatus, according to an example embodiment.
Figure 14B:
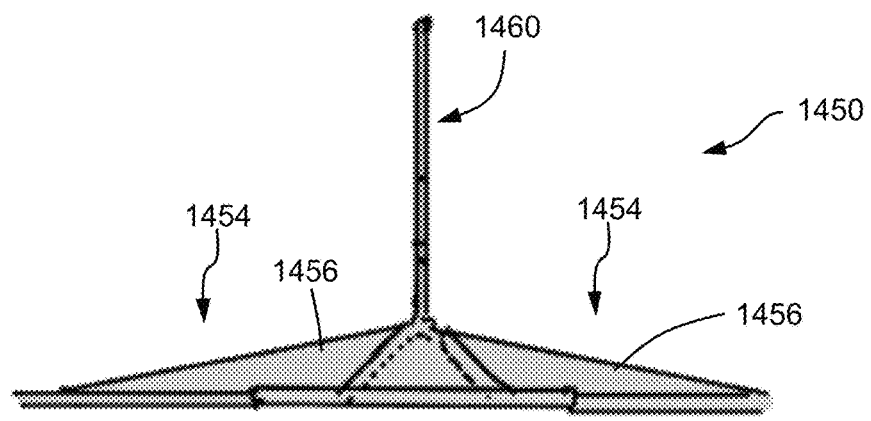
FIG. 14B is a side view of a portion of the package coupling apparatus of FIG. 14A.

Braces that may help redirect tension to address tenting may also have other configurations. For example, FIGS. 14A and 14B show a package coupling apparatus 1400 that includes a hanger 1450 with a base 1452 and a handle 1460 extending up from the base. The base 1452 may include projections 1454 that form hollow ribs 1456 that are angled upward toward the tab 1466 at the center of hanger 1450. The hollow construction of the ribs 1456 may add to the structural support of the base 1452 by increasing the footprint of the ribs 1456 against a package. Further, the ribs 1456 include dual walls that are formed around the hollow interior, thus increasing the strength of the ribs 1456.

Figure 15A:
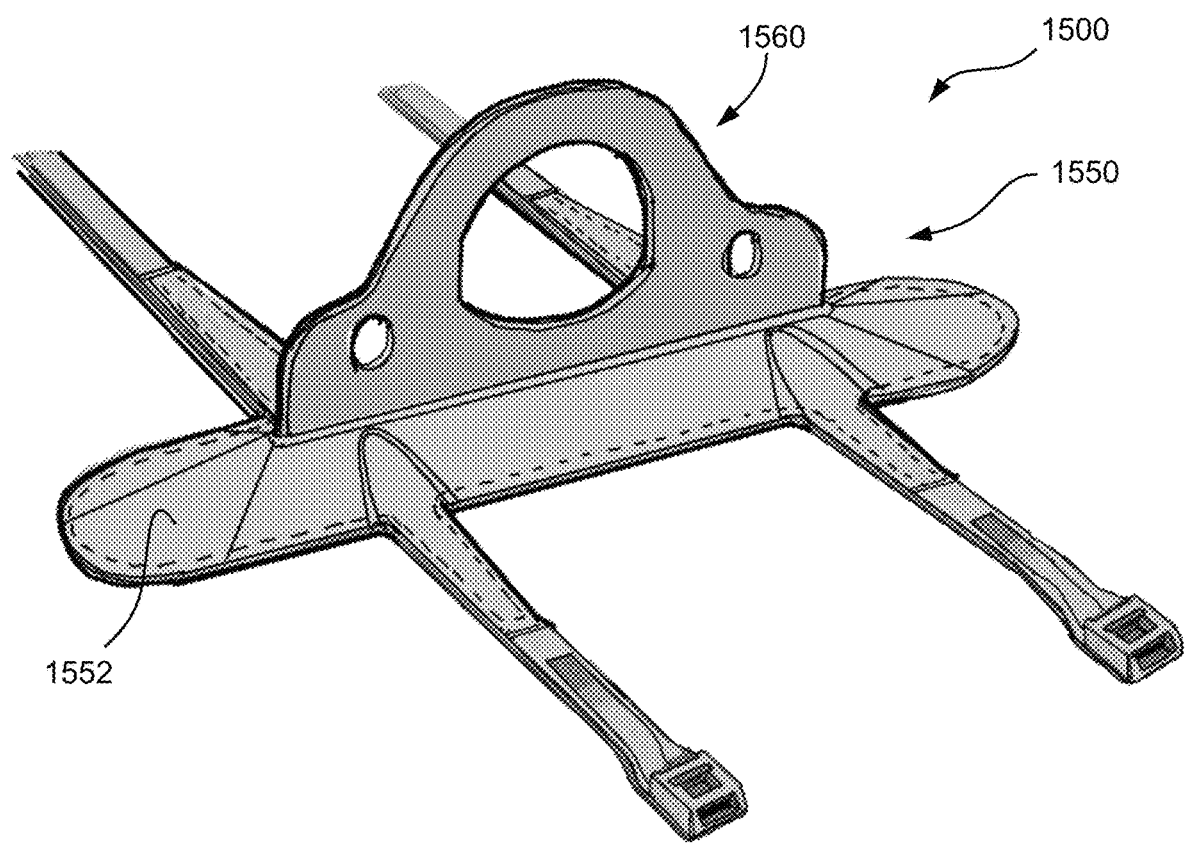
FIG. 15A is a perspective view of a portion of a package coupling apparatus, according to an example embodiment.
Figure 15B:
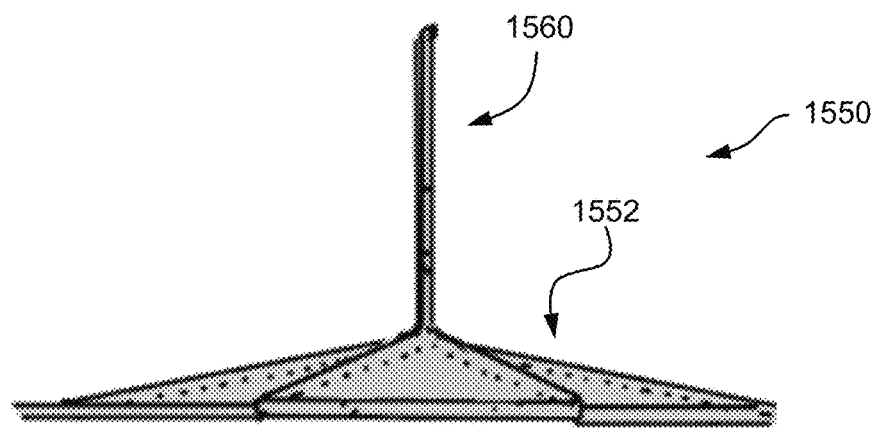
FIG. 15B is a side view of a portion of the package coupling apparatus of FIG. 15A.

Likewise, in some embodiments the entire base of the hanger may be formed as a hollow shell. For example, coupling apparatus 1500, shown in FIGS. 15A and 15B, includes a base 1552 that is formed as a hollow shell, where all of the exterior surfaces of the base are angled upward toward the handle 1560 of hanger 1550. This hollow configuration directs tension from all directions upward toward the handle, which may help alleviate tenting, as described above.

While some embodiments of the package coupling apparatus with an integrated construction include straps that extend from the hanger in two portions, such as FIGS. 13-15, in other embodiments, the strap or straps may extend from the hanger in one direction. For example, in some embodiments, the straps may be configured to extend from the hanger in one direction, loop around the package and have the distal ends secured to the hanger.

Figure 16A:
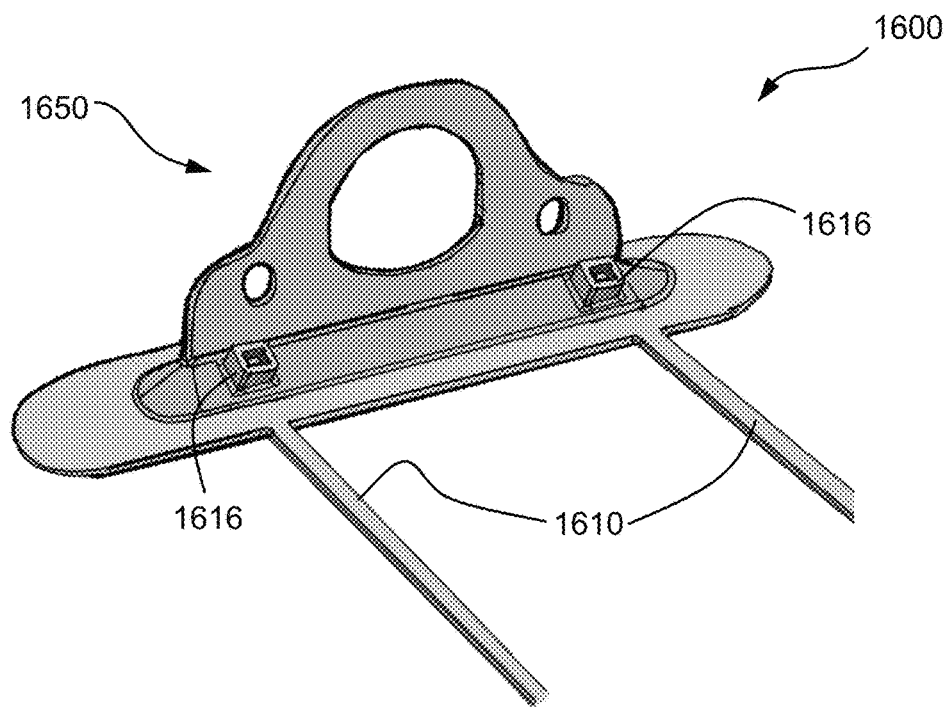
FIG. 16A is a perspective view of a portion of a package coupling apparatus, according to an example embodiment.
Figure 16B:
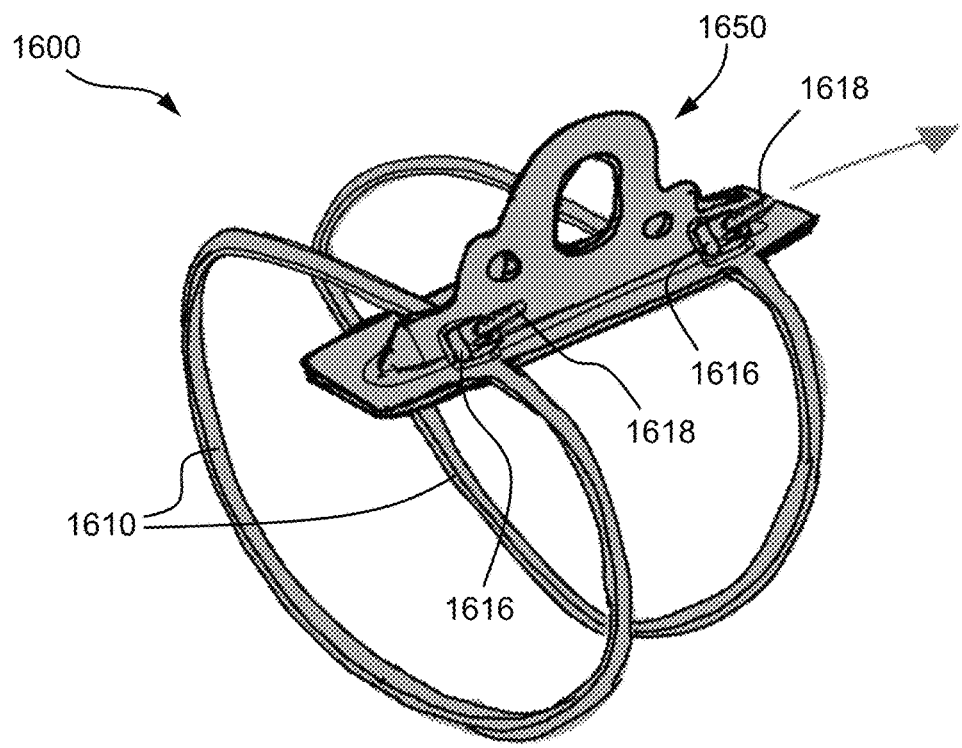
FIG. 16B is a perspective view of the package coupling apparatus of FIG. 16A in a closed configuration.

For example, FIGS. 16A and 16B show a package coupling apparatus 1600 that includes a hanger 1650 that is integrally formed with a pair of straps 1610 that extend outward from the hanger 1650 in one direction. The hanger 1650 also includes a latch 1616 associated with each of the straps 1610. As shown in FIG. 16B, the straps 1610 may be arranged so that the distal ends 1618 of each strap 1610 extends through a respective latch 1616. By returning back to the hanger 1650, the straps 1610 form a loop that is secured to the hanger 1650. Accordingly, the package coupling apparatus 1600 may be secured to a package by first inserting each strap 1610 into the respective latch 1616 to form a loop, as shown in FIG. 16B. The package may then be inserted into the loop, and the distal ends 1618 of the straps 1610 can be pulled to tighten the straps 1610 around the package. For example, the distal ends 1618 of the straps may include teeth to engage the latches 1616 and secure the straps 1610 within the latches. Alternatively, the package coupling apparatus 1600 may be placed against the package before the distal ends 1618 of the straps 1610 are inserted into the respective latches 1616.

Figure 17:
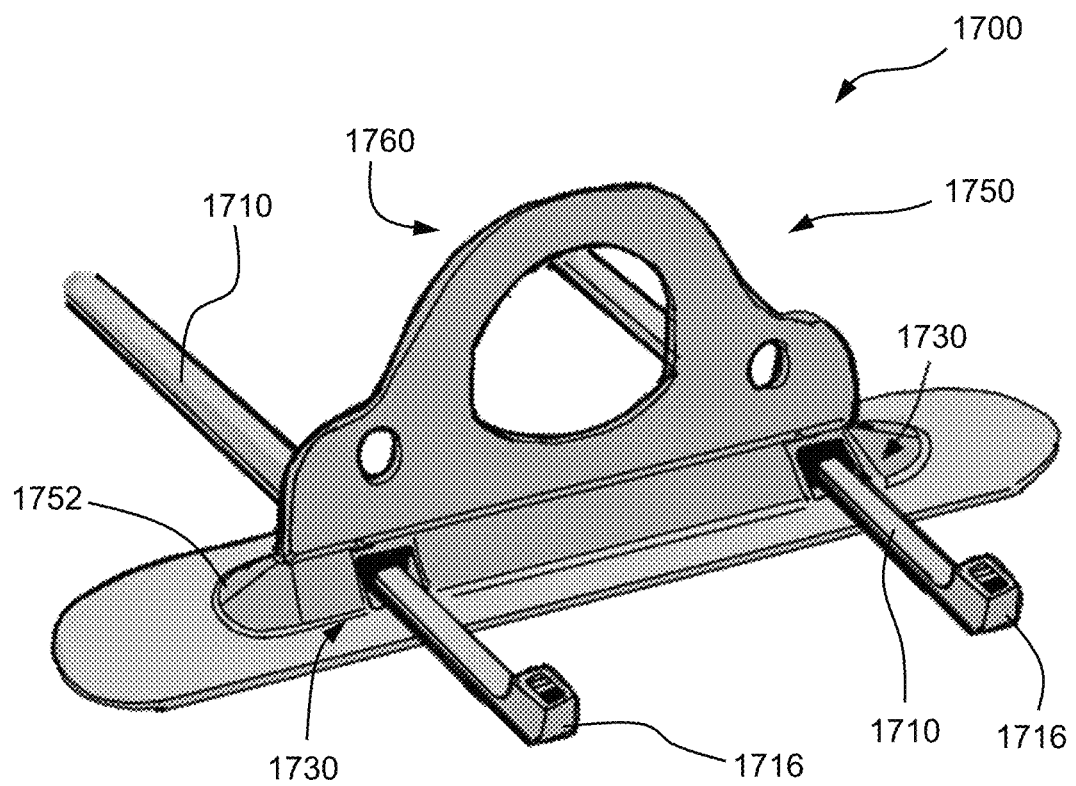
FIG. 17 is a perspective view of a portion of a package coupling apparatus, according to an example embodiment.

In some embodiments, the hanger and strap are formed as separate parts and the strap passes through the hanger. For example, FIG. 17, shows a package coupling apparatus 1700 that includes a hanger 1750 including a base 1752 and a tab 1766 with a handle 1760 extending up from the base 1752. The base 1752 includes a pair of passages 1730 that extend through the foot of the base 1752 in a direction perpendicular to the tab 1766. Accordingly, each passage 1730 extends under the handle 1760 from one side of the tab 1766 to the other. The two passages 1730 are provided at opposite ends of the handle 1760 such that the straps 1710 can firmly hold the hanger 1750 against a package.

Figure 18:
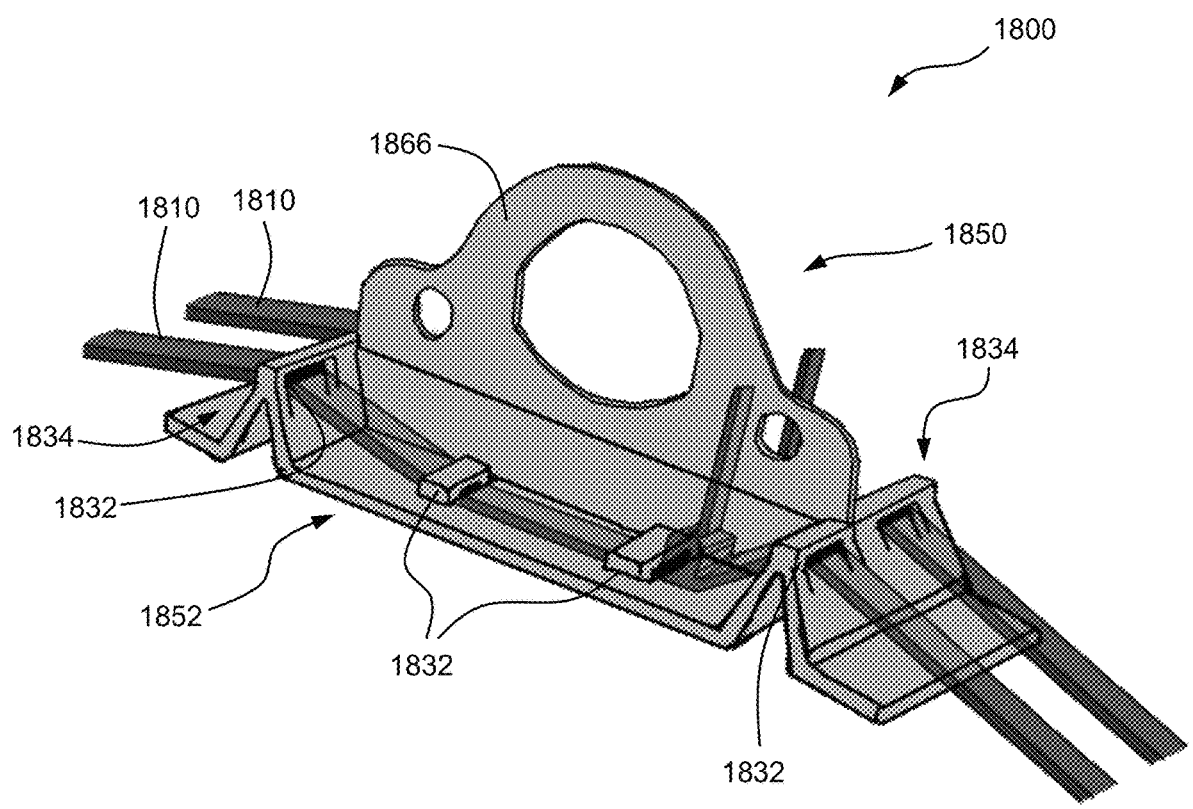
FIG. 18 is a perspective view of a portion of a package coupling apparatus, according to an example embodiment.

Further, in some embodiments, the hanger may include a series of slots for receive the strap or straps. For example, FIG. 18 shows a package coupling apparatus 1800 that includes a hanger 1850 including a base 1852 and a tab 1866 that extends up from the base 1852. On each side of the tab 1866, the base 1852 includes a series of slots 1832 for receiving a strap 1810 that runs parallel to the tab. Base 1852 also includes elevated supports 1834 at each end of the hanger 1850 with respective slots 1832 positioned at the top of the elevated supports 1834. Accordingly, when the package coupling apparatus 1800 is secured to a package, the straps 1810 are angled upward from the corners of the package to the slots 1832 at the top of the elevated supports 1834. As described above, this angled projection of the straps 1810 may help alleviate tenting.

Figure 19:
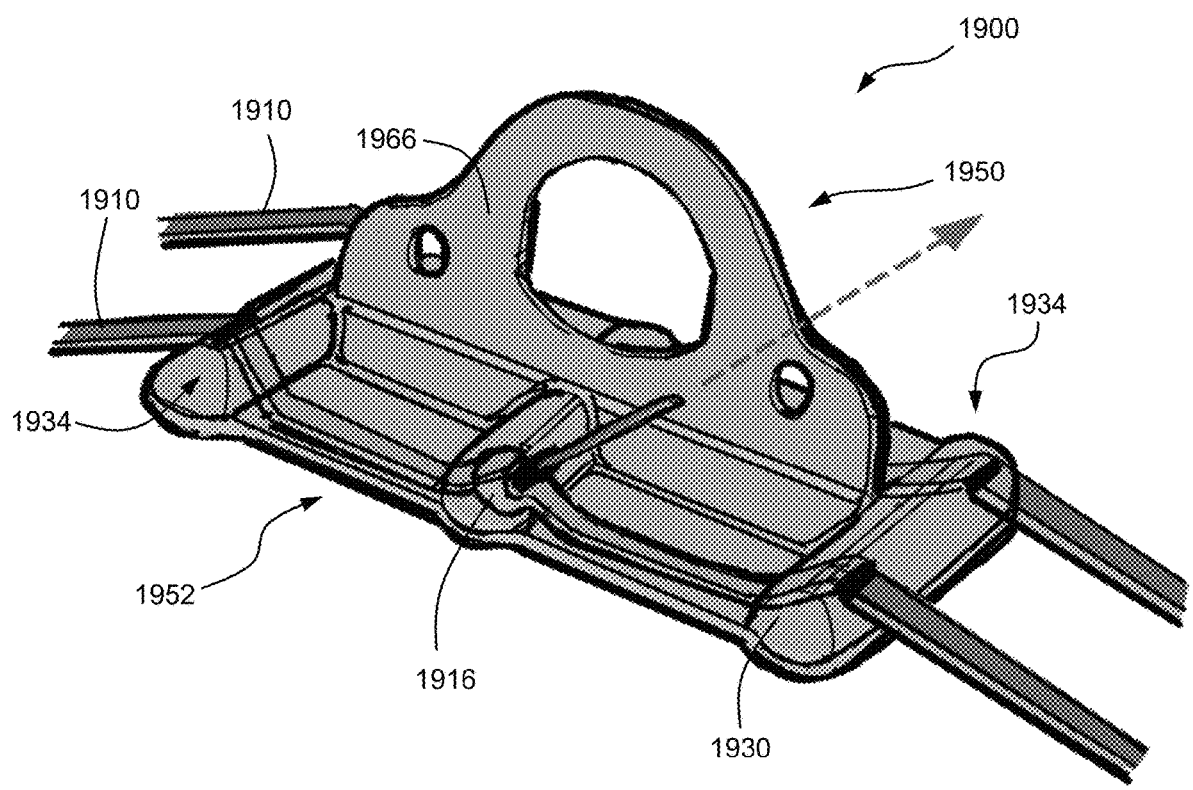
FIG. 19 is a perspective view of a portion of a package coupling apparatus, according to an example embodiment.

FIG. 19 shows another package coupling apparatus 1900 with a hanger configuration that orients the straps parallel to the tab 1966. As illustrated, the hanger 1950 includes a base 1952 and the tab 1966 extending up from the base. A passage 1930 that is configured to receive a strap 1910 extends along the entire length of the base 1952, such that the associated strap 1910 may be positioned within the base 1952 over its entire length. Similar to the package coupling apparatus 1800 shown in FIG. 18, the base 1952 of package coupling apparatus 1900 may include elevated supports 1934 and the ends of the passage 1930 may be provided at the top of the elevated supports 1934. Accordingly, the straps 1910 will angle upward from the corners of the package to the top of the elevated supports 1934 where they enter the passage 1930.

In some embodiments, the hanger is configured to hold a particular structure along the length of the strap in order to prevent movement of the strap about a package. For example, the passage 1930 of base 1952 includes an area configured to receive a latch 1916 of the respective strap 1910. With the latch 1916 held in place within the passage 1930 of the base 1952, the strap 1910 may be hindered from moving through the passage once it has been tightened.

Figure 20A:
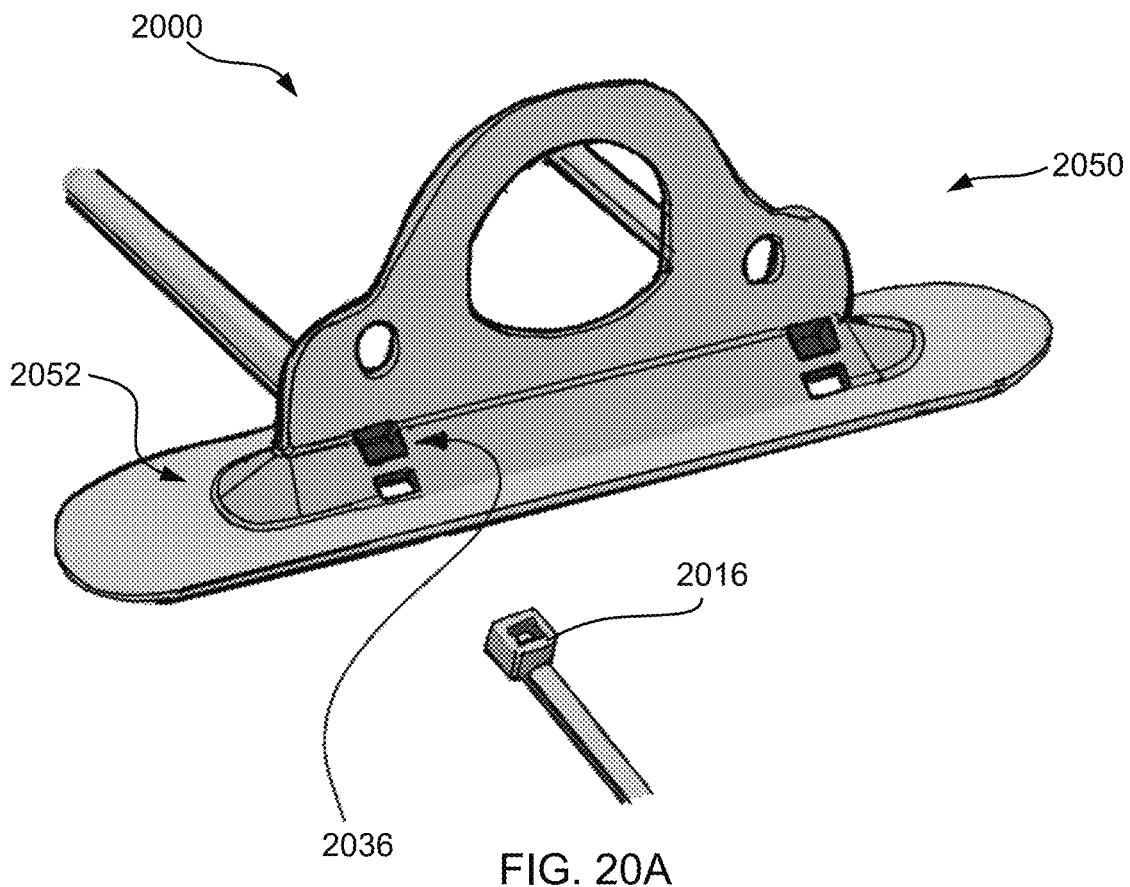
FIG. 20A is a perspective view of a portion of a package coupling apparatus, according to an example embodiment.
Figure 20B:
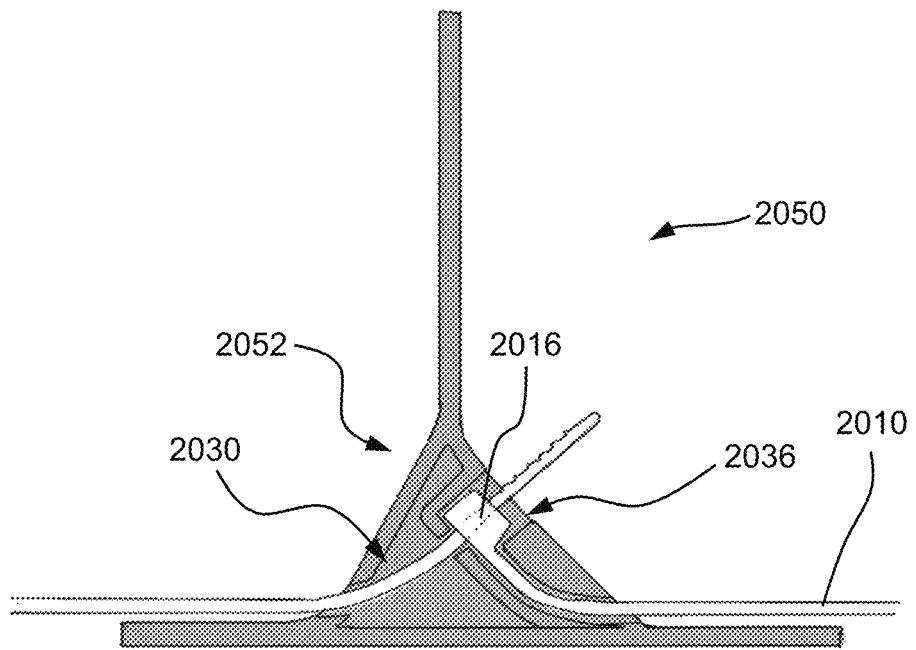
FIG. 20B is a side view of a portion of the package coupling apparatus of FIG. 20A.

Likewise, in some embodiments, the hanger may include a cavity configured to receive a component of the strap. For example, FIGS. 20A and 20B show a package coupling apparatus 2000 that includes a hanger 2050 with a base 2052 that includes a passage 2030 for receiving a strap 2010. The base 2052 may also include a cavity 2036 configured to receive a latch 2016 of the strap 2010. With the latch 2016 held in the cavity 2036 of the base 2052 when the package coupling apparatus 2000 is secured to a package, the strap 2010 may be hindered from moving through the passage 2030 and rotating about the package.

Figure 21A:
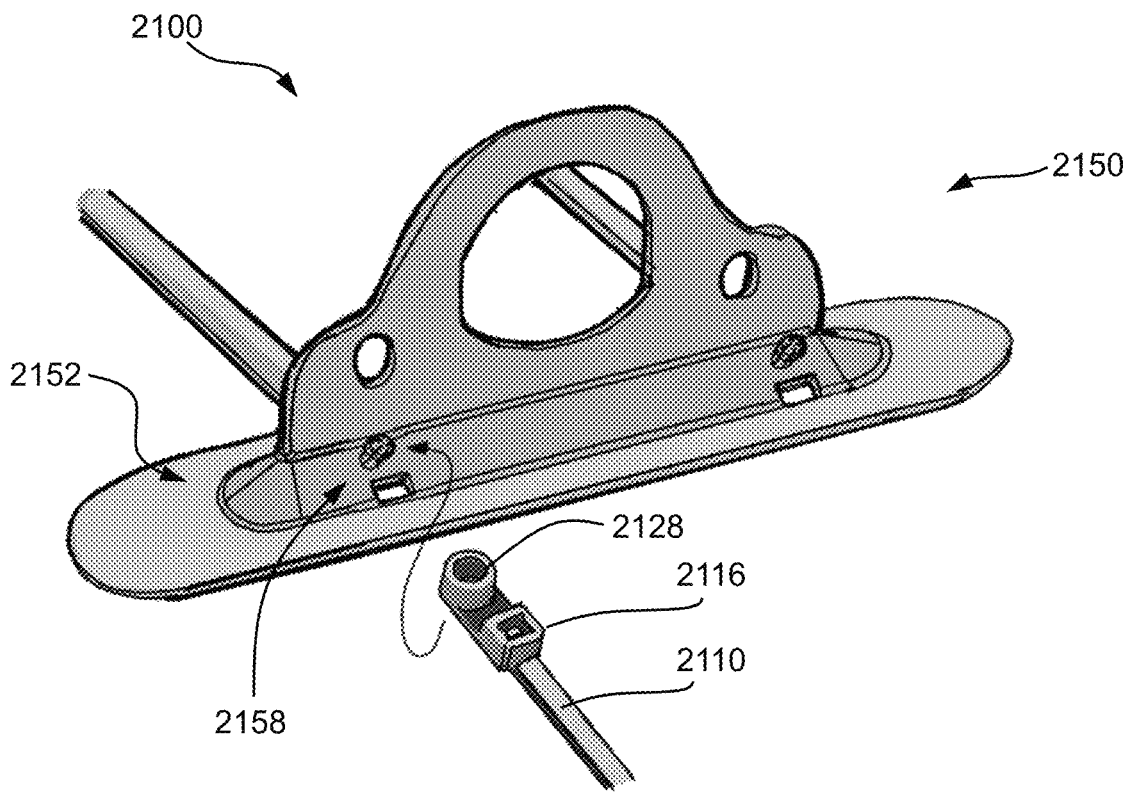
FIG. 21A is a perspective view of a portion of a package coupling apparatus, according to an example embodiment.
Figure 21B:
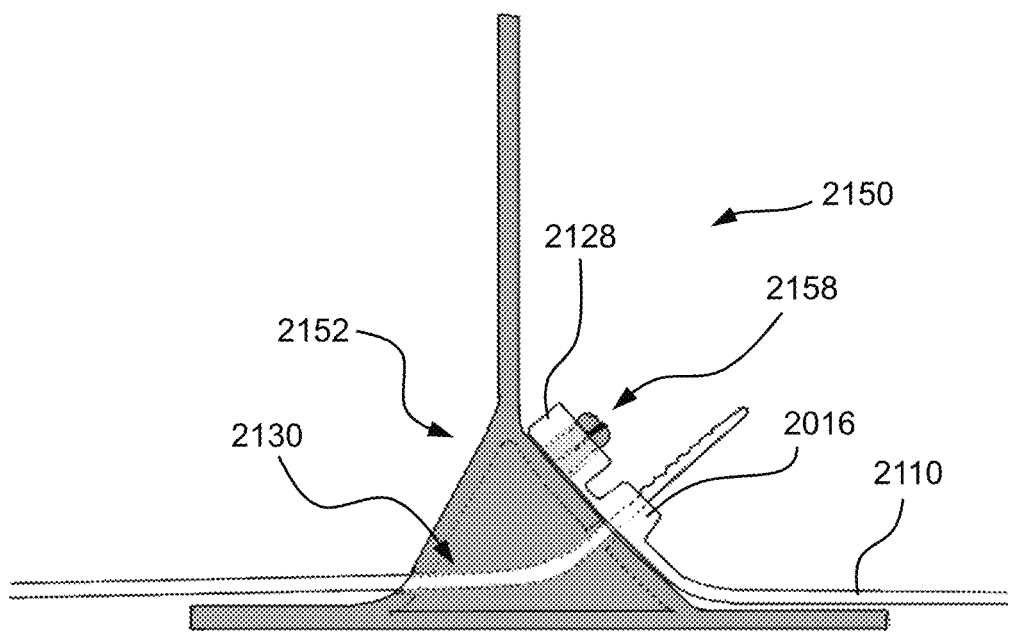
FIG. 21B is a side view of a portion of the package coupling apparatus of FIG. 21A.

Similarly, FIGS. 21A and 21B show a package coupling apparatus 2100 that also includes a hanger 2150 with a base 2152 and a strap 2110 secured to the base 2152. Specifically, the base 2152 includes a passage 2130 for receiving the strap 2110. Moreover, the base 2152 may also include a fastener 2158 and a portion of the strap 2110 may include a corresponding fastener 2128 that secures to the fastener 2158 of the base 2152. For example, the strap 2110 may include the fastener 2128 adjacent to the latch 2116, so that the latch 2116 is secured against the base 2152. The fasteners 2128 and 2158 may take a variety of different forms, including a peg and hole, as illustrated, a hook and eyelet, a buckle, a snap-fit connection, or another fastener. With the latch 2116 held against the base 2152 by the fasteners 2128, 2158 when the package coupling apparatus 2100 is secured to a package, the strap 2110 may be hindered from moving through the passage 2130 and rotating about the package.

Figure 22:
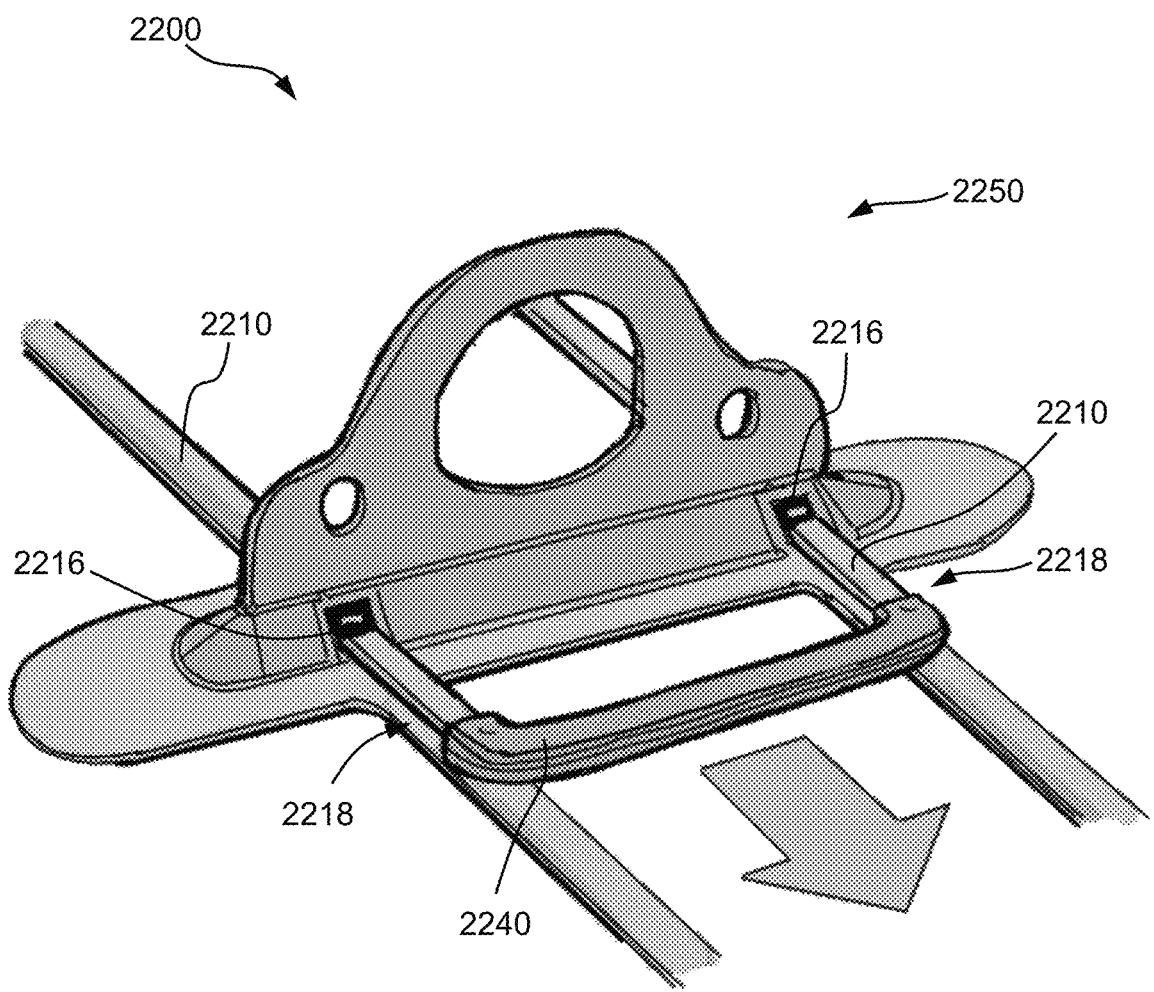
FIG. 22 is a perspective view of a portion of a package coupling apparatus, according to an example embodiment.
Figure 23A:
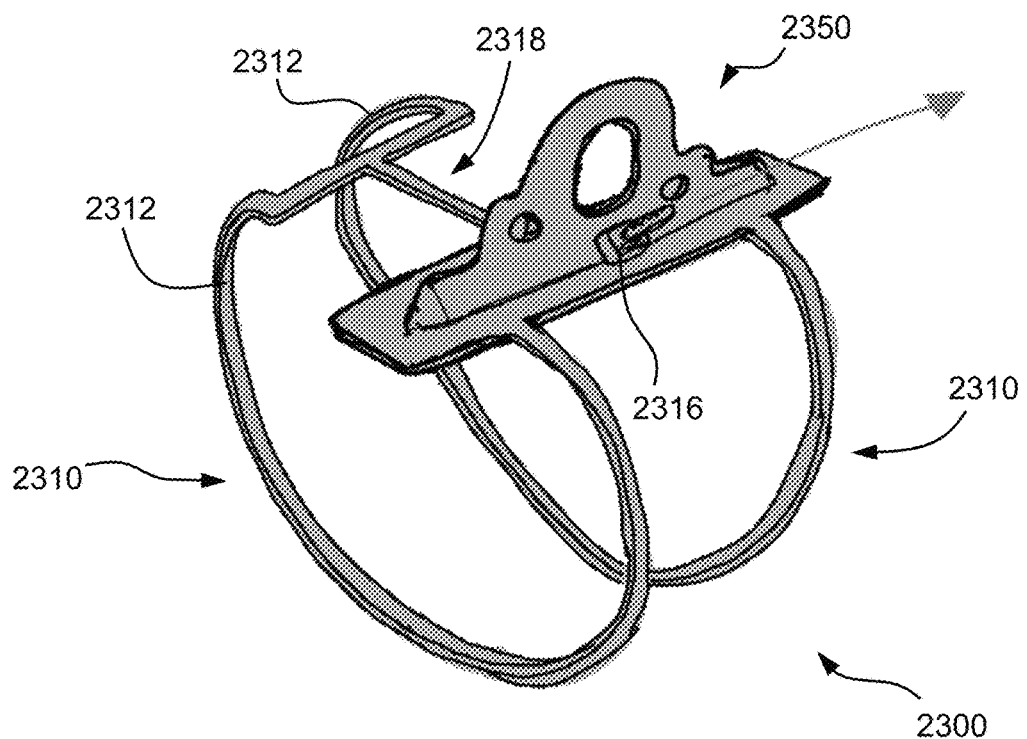
FIG. 23A is a perspective view of a package coupling apparatus in a closed position, according to an example embodiment.
Figure 23B:
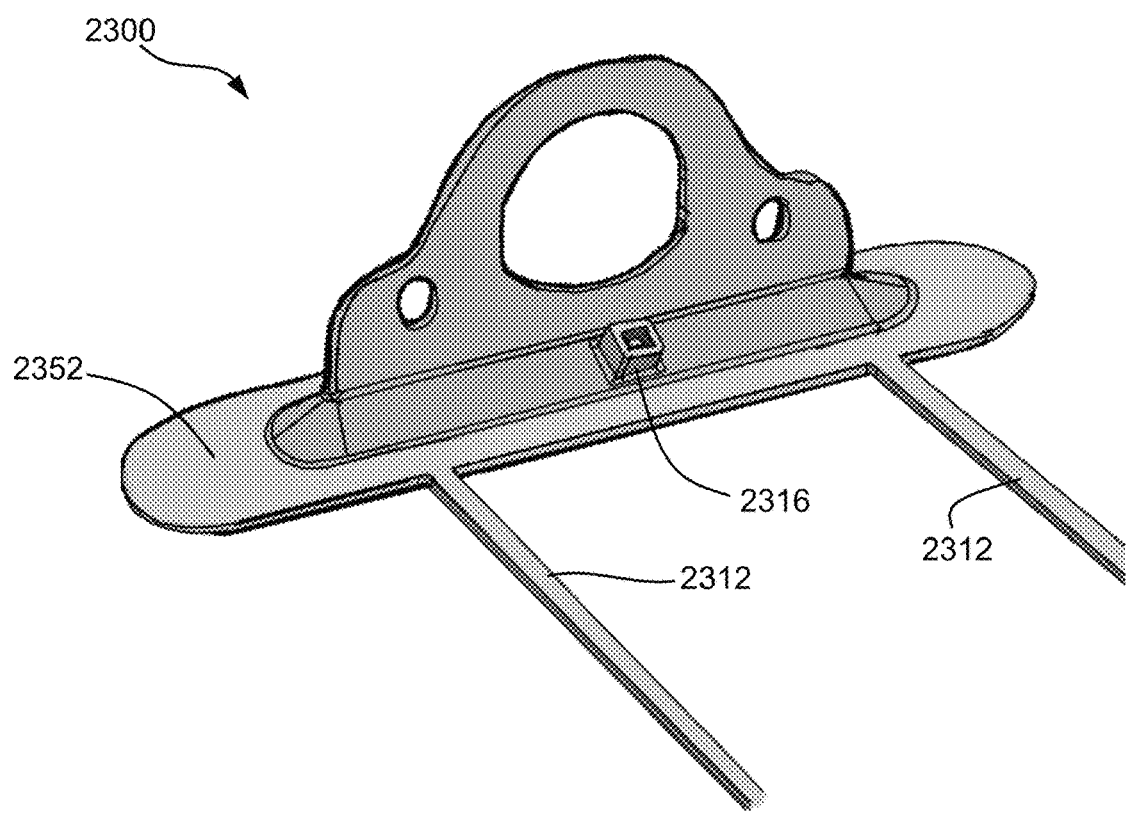
FIG. 23B is a perspective view of a portion of the package coupling apparatus of FIG. 23A.

As illustrated in FIG. 22, in some embodiments a package coupling apparatus 2200 may include a handle 2240 that extends across the ends of two parallel straps 2210. Such a handle 2240 may be used for evenly tightening both straps 2210 in the package coupling apparatus 2200 at the same time. In some embodiments, the handle 2240 may secured to the distal ends 2218 of the straps 2210 after the distal ends 2218 have been inserted through respective latches 2216. In other embodiments, the handle may be permanently attached to a section of the straps 2210.

In some embodiments, the package coupling apparatus may include a single strap configured to form a single loop around a package. In other embodiments, the package coupling apparatus may include multiple straps that are each configured to form a loop around the package. Still, in other embodiments, the package coupling apparatus may include a strap with a more complex geometry. For example, 23 shows a package coupling apparatus 2300 with a strap 2310 that has a Y configuration. The strap 2310 includes two strap portions 2312 that extend from a hanger 2350. Along the length of the strap 2310 the two strap portions 2312 are combined at a junction into a single strap portion that forms a distal end 2318 of the strap 2310. Accordingly, the base 2352 of the hanger 2350 includes single latch 2316 for receiving the distal end 2318 of the strap 2310.

The straps of the package coupling apparatus of the disclosure may be secured so as to surround a package in a variety of different ways. As explained above, in some embodiments the straps may be attached to the surface of the package with adhesive. Further, in some embodiments, the straps may be configured to be secured in a loop that extends around the package. For example, in some embodiments the ends of the straps may be secured to one another. Such an attachment of the ends of the strap may be achieved with a fastener, such as a latch and teeth as described above, a buckle, or a cinch. In other embodiments, the ends of the straps may be secured to one another with adhesive, hook and loop material, or by other methods.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A package coupling apparatus for securing a package carrying a payload to an unmanned aerial vehicle (UAV), the package coupling apparatus comprising:
   a hanger including:
      a base configured to be positioned adjacent to a package, and
      a handle extending up from the base, the handle including a handle opening and a bridge that extends over the handle opening, wherein the bridge is configured to be secured by a component of the UAV;
   a support structure configured to be secured against the package, the support structure including an aperture, wherein the handle of the hanger extends through the aperture; and
   a strap coupled to the hanger, the strap being configured to surround the package and secure the package to the hanger, and wherein the strap is configured to hold the support structure against the package.

2. The package coupling apparatus of claim 1, wherein a first end of the strap includes a row of teeth, and wherein a fastener at a second end of the strap includes a latch for engaging the row of teeth.

3. The package coupling apparatus of claim 1, wherein at least a portion of an interior surface of the strap is coated with an adhesive.

4. The package coupling apparatus of claim 1, wherein the strap includes an aperture, and wherein the handle of the hanger extends through the aperture.

5. The package coupling apparatus of claim 1, wherein the hanger is formed as a flat tab.

6. The package coupling apparatus of claim 1, wherein the support structure includes an interior space and the base of the hanger is positioned within the interior space.

7. The package coupling apparatus of claim 6, wherein the strap extends through the interior space.

8. The package coupling apparatus of claim 1, wherein the strap extends over the support structure.

9. The package coupling apparatus of claim 1, wherein the support structure includes a central peak and feet disposed on either side of the central peak, wherein the aperture extends through the central peak, and wherein the strap extends over one of the feet.

10. A system for carrying a payload using an unmanned aerial vehicle (UAV), the system comprising:
   a package for housing the payload, the package having an upper surface and a lower surface; and
   a package coupling apparatus including:
      a hanger having a base adjacent to the package and a handle extending up from the base, the handle including a handle opening and a bridge that extends over the handle opening, wherein the bridge is configured to be secured by a component of the UAV;
      a support structure configured to be secured against the package, the support structure including an aperture, wherein the handle of the hanger extends through the aperture; and
      a strap coupled to the hanger and surrounding the package so as to secure the package to the hanger, and wherein the strap is configured to hold the support structure against the package.

11. The system of claim 10, wherein a first end of the strap extends through a hole in a fastener at the second end of the strap so as to form a loop around the package, wherein the first end of the strap includes a row of teeth, and wherein the fastener includes a latch that secures the first end of the strap in the opening of the fastener.

12. The system of claim 10, wherein at least a portion of an interior surface of the strap is attached to a surface of the package with adhesive.

13. The system of claim 12, wherein a portion of the strap tapers upward from an edge of the upper surface of the package toward a central portion of the package.

14. The system of claim 12, wherein the hanger is formed as a flat tab.

15. A method of securing a package for carrying a payload using an unmanned aerial vehicle (UAV), the method comprising:
   positioning a hanger of a package coupling apparatus on a package such that a base of the hanger is adjacent to an upper surface of the package and a handle of the hanger extends up from the base, the handle including a handle opening and a bridge that extends over the handle opening, wherein the package coupling apparatus includes a support structure configured to be secured against the package, wherein the support structure includes an aperture, and wherein the handle of the hanger extends through the aperture; and
   arranging a strap that is coupled to the hanger so as to surround the package and secure the hanger to the package.

16. The method of claim 15, wherein arranging the strap includes inserting a first end of the strap through a hole in a fastener at a second end of the strap so as to form a loop around the package, wherein the first end of the strap includes a row of teeth, and wherein the fastener includes a latch that secures the first end of the strap in the opening of the fastener.

17. The method of claim 15, wherein at least a portion of an interior surface of the strap includes adhesive, and wherein arranging the strap includes adhering the strap to a surface of the package using the adhesive.

18. The method of claim 15,
   wherein arranging the strap includes securing the strap over the support structure using an adhesive.

19. The method of claim 15, further comprising securing the bridge of the handle of the package coupling apparatus in a channel of a payload retriever attached to a tether of the UAV.

20. The method of claim 15, wherein the hanger is formed as a flat tab.

* * * * *